(12) United States Patent
Zalevsky et al.

(10) Patent No.: US 12,536,611 B2
(45) Date of Patent: Jan. 27, 2026

(54) METHOD AND SYSTEM FOR SUPER-RESOLVED IMAGING

(71) Applicant: Bar Ilan University, Ramat Gan (IL)

(72) Inventors: Zeev Zalevsky, Rosh HaAyin (IL); Gal Chen, Yavne (IL)

(73) Assignee: Bar Ilan University, Ramat Gan (IL)

( * ) Notice: Subject to any disclaimer, the term of this patent is extended or adjusted under 35 U.S.C. 154(b) by 485 days.

(21) Appl. No.: 18/063,445

(22) Filed: Dec. 8, 2022

(65) Prior Publication Data

US 2023/0177644 A1 Jun. 8, 2023

Related U.S. Application Data

(60) Provisional application No. 63/287,098, filed on Dec. 8, 2021.

(51) Int. Cl.
 *G06T 3/4053* (2024.01)
 *G03B 21/20* (2006.01)
 (Continued)

(52) U.S. Cl.
 CPC .......... *G06T 3/4053* (2013.01); *G03B 21/206* (2013.01); *G06T 5/10* (2013.01);
 (Continued)

(58) Field of Classification Search
 CPC ............... G06T 3/4053; G06T 5/10; G06T 2207/30196; G06T 3/4069; G03B 21/206; G06V 10/141; G06V 10/25; G06V 10/14
 (Continued)

(56) References Cited

U.S. PATENT DOCUMENTS 9,674,430 B1 * 6/2017 Li .................. H04N 23/683
12,216,234 B2 * 2/2025 Sumi ................ G01S 7/52041
(Continued)

OTHER PUBLICATIONS

Influence of laser spot size at diffuser plane on the longitudinal spatial coherence function of optical coherence microscopy system, by Usmani, Kashif, et al. , Pub: ARXIV ID: 1904.04245 Digital Object Identifier: 10.1364/JOSAA.36.000D41, Apr. 7, 2019 (Year: 2019).*

(Continued)

*Primary Examiner* — Jennifer Mehmood
*Assistant Examiner* — Heath E. Wells
(74) *Attorney, Agent, or Firm* — FisherBroyles, LLP; Roger L. Browdy; James E. Mrose

(57) ABSTRACT

An imaging system is presented for imaging a region of interest. The system includes an imaging arrangement having diffraction limited resolution. The imaging arrangement includes a spatial light encoder scattering medium) which applies spatial encoding patterns to coherent light and provides encoded illuminations of the region of interest located behind the encoder to create encoded diffraction limited images on a detector array. A position controller is provided which sequentially provides relative displacements between the coherent light path and the region of interest, resulting in a plurality of M laterally displaced encoded illuminations in a region of interest plane, displaced by δx (and/or δx) between them such that they are characterized by substantially constant appearances of the encoded structure of the coherent light field. This enables super-resolution reconstruction of an image of the region of interest from corresponding M image data pieces without prior knowledge about the encoding patterns.

28 Claims, 15 Drawing Sheets
(9 of 15 Drawing Sheet(s) Filed in Color)

(51) Int. Cl.
*G06T 5/10* (2006.01)
*G06V 10/141* (2022.01)
*G06V 10/25* (2022.01)

(52) U.S. Cl.
CPC ............ *G06V 10/141* (2022.01); *G06V 10/25* (2022.01); *G06T 2207/30196* (2013.01)

(58) Field of Classification Search
USPC ........................................................ 382/299
See application file for complete search history.

(56) References Cited

U.S. PATENT DOCUMENTS

| | | | | |
|---|---|---|---|---|
| 2012/0250032 | A1* | 10/2012 | Wilde | G01B 9/02047 356/521 |
| 2015/0199792 | A1* | 7/2015 | Pavani | H04N 25/134 382/254 |
| 2017/0025247 | A1* | 1/2017 | Stevens | H01J 37/28 |
| 2017/0068766 | A1* | 3/2017 | Eldesouki | G06F 30/392 |
| 2017/0254932 | A1* | 9/2017 | Huang | G02F 1/21 |
| 2019/0129161 | A1* | 5/2019 | Ahluwalia | G02B 6/02004 |
| 2019/0272622 | A1* | 9/2019 | Voroshilov | G06T 3/4007 |
| 2019/0282185 | A1* | 9/2019 | Gregerson | A61B 6/4488 |
| 2022/0138905 | A1* | 5/2022 | Sommese | G06T 1/20 348/164 |

OTHER PUBLICATIONS

Roadmap on Recent Progress in FINCH Technology, by Rosen, Joseph, et al. Pub: Journal of Imaging, 7(10), 197, 2021-09-29 (Year: 2021).*

Image reconstruction and enhancement through wavelength-sensitive speckle multiplexing and deconvolution, by Zhao Wang, Rui Ma, Yong Zhang, Hong Yang Zhu, Jun Liu, Yaron Bromberg, Wei Li Zhang, 2021 Conference on Lasers and Electro-Optics (CLEO) (2021, pp. 1-2), Publication Date: May 1, 2021 (Year: 2021).*

Single-Pixel Fluorescent Diffraction Tomography, by Stockton, Patrick A., Field, Jeffery J., Squier, Jeff, Pezeshki, Ali, Bartels, Randy A., ARXIV ID: 2008.02376 Publication Date: Aug. 5, 2020 (Year: 2020).*

Phase and amplitude imaging with quantum correlations through Fourier Ptychography, By Aidukas et al., Scientific Reports, 9, 10445, Jul. 18, 2019 (Year: 2019).*

Garcia, et al., Full field of view super-resolution imaging based on two static gratings and white light illumination, Applied Optics, 47(17):3080-3087 (2008).

Henriques, et al., PALM and STORM: Unlocking Live-Cell Super-Resolution, Biopolymers, 95(5):322-331 (2011).

Huang, et al., Breaking the Diffraction Barrier: Super-Resolution Imaging of Cells, Cell, 143:1047-1058 (2010).

Min, et al., Fluorescent microscopy beyond diffraction limits using speckle illumination and joint support recovery. Science Reports, 3(2075):1-6 (2013).

Wagner, et al., Superresolved imaging based on wavelength multiplexing of projected unknown speckle patterns, Applied Optics, 54(13):D51-D60 (2015).

Zalevsky, et al., Super resolution optical systems for objects with finite sizes, Optics Communications, 163:79-85 (1999).

Zalevsky, et al., Optical Systems with Improved Resolving Power, Prog. Opt., 40:271-341 (1999).

* cited by examiner

METHOD AND SYSTEM FOR SUPER-RESOLVED IMAGING

TECHNOLOGICAL FIELD

The invention is generally in the field of imaging techniques and relates to a method and system for super-resolution, enabling super-resolution imaging of a region of interest using spatial light encoding.

BACKGROUND ART

References considered to be relevant as background to the presently disclosed subject matter are listed below:
1. Z. Zalevsky, D. Mendlovic and A. W. Lohmann, "Optical system with improved resolving power," Prog. Opt. 40, 271-341 (1999).
2. J. García, V. Micó, D. Cojoc and Z. Zalevsky, "Full field of view super-resolution imaging based on two static gratings and white light illumination," Appl. Opt. 47, 3080-3087 (2008).
3. Z. Zalevsky, D. Mendlovic and A. W. Lohmarin, "Super resolution optical systems using fixed gratings," Opt. Commun. 163, 79-85 (1999).
4. B. Huang, H, Babcock and X, Zhuang. "Breaking the diffraction barrier: Super-resolution imaging of cells," Cell 143, 1047-1058 (2010).
5. R. Henriques, C. Griffiths, E. H. Rego and M. M. Mhlanga, "PALM and STORM: unlocking live-cell super-resolution," Biopolymers 95, 322-331 (2011).
6. J. Min, J, Jang, D. Keurn, S.-W. RyLi, C. Choi, K.-H. Jeong and J. C. Ye "Fluorescent microscopy beyond diffraction limits using speckle illumination and joint support recovery," Sci Rep 3, 2075 (2013).
7. O. Wagner, A. Schwarz, A. Shearer, C. Ferreira, J. Garcia and Z. Zalevsky, "Super Resolved Imaging Based upon Wavelength Multiplexing of Projected Unknown Speckle Patterns," Appl. Opt. 54, D51-D60 (2015).

Acknowledgement of the above references herein is not to be inferred as meaning that these are in any way relevant to the patentability of the presently disclosed subject matter.

BACKGROUND

Imaging systems have resolution limitations due to several mechanisms, diffraction being one of them. Diffraction limit produces a spatial low pass filtering and a loss of imaging resolution.

Super-resolution techniques can be used to solve this problem. To this end, high-resolution spatial information can be encoded into another dimension or axis. This means that one domain is sacrificed in order to improve the spatial domain. There are many super resolution methods, each one sacrificing a different axis, for example, the time axis, the wavelength axis or even the field of view. Another example is the case of 1-D objects, where the a priori information regarding object's dimension can be used to overcome the diffraction limitation, i.e., one can look at a 1-D object as if it has two dimensions or to use the spectral dilation method. One can rely on optical fluctuation in order to achieve better resolution, living cells can be super-resolved by molecule localization microscopy methods such as STED, PALM and STORM [5]. Each method requires some a priori knowledge about the object's characteristics to know which axis could be sacrificed in order to have the ability to perform the encoding/decoding super resolving process.

General Description

There is a need in the art of super-resolution imaging techniques of the type utilizing spatial encoding to enable to eliminate a need for a priori knowledge about the object being imaged and/or about spatially encoding information.

The present disclosure presents a novel approach for super-resolution imaging which utilizes a novel time multiplexing technique enabling increase of spatial resolution of a diffraction limited imaging arrangement and especially in obscure visibility conditions.

Time multiplexing approach is generally known. In one known in the art approach of time multiplexing two moving gratings (spatial encoders are used: one grating encodes the high-resolution spatial information and is positioned in front of the object, and the other grating is positioned near the detector and decodes the high-resolution information. Time multiplexing requires that the object being imaged does not change in time, i.e., u (x, y, t)=u (x, y), where u (x, y, t) is the object's spatiotemporal field. This restriction is imposed because the purpose of the gratings is to encode spatial high-resolution information into different time slots. As a consequence, if the object was changing in time, then the method would not work properly. Another important piece of information required in this known technique is the spatial distribution of the spatially encoding structure. This information is important because one needs to know how the information is being encoded over time by the grating.

Typically, in order to achieve an improvement in the resolution, the illuminated structure needs to have a resolution that is at least as the required image resolution, and therefore, the projecting system is expected to have better optics than the imaging system optics. There are available techniques allowing to avoid the requirement for better optics in the projecting system. One of these techniques is to illuminate a diffuser with a laser, thus creating a speckle pattern on the object. This technique is a cheap way to illuminate a pattern on an object, while the resolution of the pattern can be determined by locating the diffuser at the right distance from the object [6-7].

The new approach of the present disclosure overcomes the diffraction limitation of resolution without the need of knowing the spatial distribution of the encoding structure (grating). Furthermore, the spatial distribution of the encoding structure is decoded out of the set of captured low-resolution images. The inventors have demonstrated previously the technique of time multiplexing super-resolved imaging, in which the use of a plurality of wavelengths in the incident light was used to eliminate a need for a priori knowledge of the encoding grating [7].

According to the technique of the present disclosure, monochromatic coherent light can be used, and is directed to interact with a spatial encoder and then propagate to a region of interest being imaged to form encoded illumination of the region of interest. Light returned from the region of interest in response to this illumination is detected by a detector array forming a diffraction limited (low resolution) image. Multiple imaging sessions are performed while providing relative displacements (lateral or angular) between the input light propagation path and the region of interest providing lateral displacements of the encoded illumination in the region of interest plane, such that a sequence of low-resolution images is acquired by the detector array encoded by the encoding function (of the spatial encoder) spatially shifted for each image acquisition. As a result, each image contains a different combination of different portions in the spatial spectrum of the region of interest. The relative displacement is controlled to provide a sequence of encoded light fields of substantially constant encoding function illuminating the region of interest (i.e., substantially constant appearances of the encoded structure in the region of interest plane). This enables super-resolution reconstruction of the image of the region of interest from of a corresponding sequence of image data pieces produced by the detector array.

Thus, according to one broad aspect of the invention, it provides an imaging system for imaging a region of interest, the imaging system comprising:

an imaging arrangement having a characteristic diffraction limited resolution, the imaging arrangement comprising:

a projector system configured to project a coherent light beam propagating along a general propagation path onto a patterned structure of a spatial light encoder, interaction of the coherent light beam with the spatial light encoder producing a light field of an encoded structure propagating towards the region of interest, thereby providing encoded illumination of the region of interest; and a detection system at a certain fixed location with respect to the region of interest, the detection system being configured for collecting light response from the region of interest to said encoded illumination and creating a diffraction limited image R of the region of interest on a detector array; and a position controller configured and operable to sequentially provide relative displacements between the general propagation path and the region of interest, such that said relative displacements provide a plurality of M laterally displaced encoded illuminations in a region of interest plane, by at least lateral displacements δx along at least an x-axis respectively, such that said M laterally displaced encoded illuminations are characterized by substantially constant appearances of the encoded structure of said light field therein, thereby enabling super-resolution reconstruction of an image of the region of interest from a plurality of M image data pieces produced by the detector array being indicative of M diffraction limited images $R_m$ (m=1, . . . M) corresponding to detected light responses of said plurality of M encoded illuminations, without prior knowledge of data indicative of the encoded structure of the light field.

By knowing the displacement-related connections between different images (i.e., image data pieces assigned with the respective displacements being applied), the different portions of the spectrum of the region of interest can be extracted. Considering the encoding pattern having periodicity in space and thus presenting a Fourier series of Dirac delta functions, every portion of the spectrum has a different coefficient according to the Fourier coefficient of the high-resolution pattern that illuminates the region of interest.

It should be understood that the technique of the present disclosure is aimed at providing certain super-resolution at the region of interest plane, defined by the smallest feature size d of the encoded illumination at the region of interest plane. The imaging arrangement may be configured using Fourier-based configuration (i.e. the encoder is in a Fourier plane or plane conjugate thereto with respect to the region of interest plane) or an imaging configuration inducing a magnification factor. Considering the Fourier-based configuration (which is mostly practical and easier system configuration), the smallest feature size d of the encoded illumination at the region of interest plane is determined as $$d = \frac{\lambda z}{D},$$

where λ is me wavelength of the coherent light beam, z is a distance between the encoder and region of interest planes, and D is a spot size of the coherent beam projection on the spatial light encoder plane. As for the imaging configuration, the smallest feature sized d of the encoded illumination at the region of interest plane is determined as $d=d_0 M_f$, where $d_0$ is the smallest feature size of a pattern of the spatial light encoder and $M_f$ is the magnification factor. The spatial light encoder may generally include any spatial light modulator such that the size D of the coherent beam projection on the encoder covers highly dense pattern of the encoder. Preferably, the encoder is a scattering medium thus always satisfying such a condition.

It should also be understood that in order to obtain substantially constant appearances of the encoded structure in the region of interest plane for the displaced encoded illuminations, the value of the displacement/shift of the encoded illumination δx (and/or δy) in the region of interest plane is to be proportional to a fraction of the desired super-resolution d. For example, δx may be smaller or equal (preferably smaller) than d, i.e. δx<d, or δx=Cd+Bd, where C is integer C≥1, and 0<B<1.

Also, the displacement of the general propagation path, i.e., "physical displacement" to be performed in order to obtain the above-described displacement/shift δx (and/or δy) of the encoded illumination at the region of interest plane, depends on whether the imaging arrangement utilizes the Fourier-based configuration or the imaging configuration. More specifically, considering the Fourier-based configuration, the displacement/shift δx (and/or δy) can be achieved by an angular displacement α of the general propagation path, which is determined in accordance with the required smallest super-resolution. (i.e. the smallest feature size d of the encoded illumination at the region of interest plane) and the distance z between the encoder and region of interest planes, i.e., tan(α)=δx/z. Considering the imaging configuration, the displacement/shift δx (and/or δy) of the encoded illumination at the region of interest plane is achieved by the physical relative displacement δx' between the general propagation path and region of interest which is a lateral displacement determined as $δx'=δxM_f$.

To this end, the position controller is configured and operable to sequentially provide the relative lateral displacements (e.g. lateral displacements along the at least x-axis or angular displacement), such that said relative displacements provide the plurality of M displacements δx of the encoded illuminations at the region of interest plane satisfying a predetermined condition with respect to the smallest feature size d of the encoded illumination at the region of interest plane (defining the required super-resolution of image reconstruction), the projector system thereby sequentially providing the corresponding plurality of said M encoded illuminations of the substantially constant appearances of the encoded structure of said light field.

The detection system sequentially provides the plurality of the M diffraction limited images $R_m$, each diffraction limited image being a product of an image of the region of interest $S_m(x)$ with the encoded structure $E_m$, thereby enabling the reconstruction of the image of the region of interest from the plurality of M image data pieces without the prior knowledge of the encoded structure $E_m$, with spatial resolution higher than said characteristic diffraction limited resolution of the imaging arrangement.

The imaging system may further include a control unit configured for data communication with the imaging arrangement and operable to receive and process said image data pieces $R_m$ to perform said super-resolution reconstruction of the image $S(x)$ of the region of interest.

The control unit may include: a first processor configured and operable to receive said image data pieces $R_m$, being determined as $(S_m \times E_m)$, and perform a Fourier transform to obtain $\tilde{R}$; a second processor configured an operable to utilize input data indicative of the displacement $\delta x$ and a required super-resolution $\delta \mu$, and extract from said Fourier transform $\tilde{R}$ a spectral representation, $\tilde{S}(\mu)$, of the image of the region of interest; and a third processor configured to perform inverse Fourier transform of the spectral representation, $\tilde{S}(\mu)$, to extract the image of the region of interest $S(x)$ along said at least x-axis.

As noted above, the spatial encoder may generally include any spatial light modulator. Preferably, however, the spatial encoder comprises a scattering medium, such that said encoded structure is in the form of a primary speckle pattern. More specifically, when using the scattering medium, the spatial resolution is of the order of the smallest speckle size d on the region of interest plane being determined as $\lambda z/D$.

In some embodiments, the spatial light encoder is transmitting for said coherent light beam such that the coherent light beam passes through the spatial light encoder and propagates towards the region of interest, thereby providing for super-resolution imaging of the region of interest located behind the spatial light encoder.

In some examples, the detection system is located upstream of the spatial light encoder with respect to the general propagation direction of said coherent light beam, such that the light response from the region of interest to said encoded illumination passes through the spatial light encoder towards the detection arrangement. As described above, the spatial light encoder is preferably a scattering medium, said encoded structure being in the form of a primary speckle pattern. The spatial resolution is of the order of a smallest speckle size d on the region of interest plane being determined as $\lambda z/D$, wherein $\lambda$ is a wavelength of the coherent light beam, and z is a distance from the recording medium to the region of interest and D is the spot size of the projection of the coherent light beam onto the scattering medium.

The position controller may be configured to provide said relative displacements by displacements of the general propagation path of the coherent light beam with respect to the scattering medium.

In some embodiments, the imaging system is configured for imaging the region of interest inside a subject's body via a scattering medium of a skin operating as said spatial light encoder transmitting the coherent light beam therethrough and transmitting the light response of the region of interest therethrough towards the detection system, said encoded structure being in the form of a primary speckle pattern. The spatial resolution of the reconstructed image is of the order of a smallest speckle size d on the region of interest plane being determined as $\lambda z/D$, wherein $\lambda$ is a wavelength of the coherent light beam, z is a distance from the recording medium to the region of interest, and D is the spot size of the projection of the coherent light beam onto the scattering medium. The position controller is configured to provide displacements of the general propagation path of the coherent light beam to the scattering medium.

According to another broad aspect of the invention, it provides an imaging system for imaging a region of interest, the imaging system comprising:

an imaging arrangement having a characteristic diffraction limited resolution, the imaging arrangement comprising:
  a projector unit configured to project a coherent light beam propagating along a general propagation path via an interaction with a scattering medium located in said general propagation path at a distance z from a region of interest plane, interaction of the coherent light beam with the scattering medium producing a primary speckle pattern having a smallest speckle size d on the region of interest plane determined as $\lambda z/D$, wherein $\lambda$ is a wavelength of the coherent light beam, and D is a spot size of projection of the coherent light beam onto the scattering medium forming encoded speckles illumination of the region of interest; and
  a detection arrangement at a certain fixed location with respect to the region of interest, the detection arrangement being configured for collecting encoded speckled light response from the region of interest, having propagated back through the scattering medium and creating a diffraction limited image of the region of interest on a detector array; and
  a position controller configured and operable to sequentially provide relative displacements between the general propagation path of said encoded illumination and the region of interest, such that relative displacements provide a sequence of M laterally displaced encoded illuminations in a region of interest plane, at least along an x-axis, characterized by substantially constant appearances of the encoded structure of said light field in said M laterally displaced encoded illuminations, thereby enabling super-resolution reconstruction of an image of the region of interest from of a sequence of M image data pieces produced by the detector array being indicative of M diffraction limited images $R_m$ (m=1, . . . M) corresponding to detected light responses of said sequence of the M encoded illuminations, without prior knowledge of data indicative of the encoded structure of the light field, the super-resolution being of the order of the smallest speckle size d.

It should be noted that the constant appearance of the primary speckle patterns in the illuminations displaced in the region of interest plane by the displacement $\delta x < d$ result from the lateral and/or angular displacements determined as described above. This can be obtained either by displacing the entire projection system (including the scattering medium) or the light source only. Considering the angular displacement of the light propagation path, the constant appearance of the primary speckle pattern is maintained due to a so-called "memory effect" guaranteed by the above condition of the laterally displaced encoded illuminations.

According to yet further broad aspect of the invention, it provides a method for imaging a region of interest in a subject's body, the method comprising:
  projecting a coherent light beam propagating along a general propagation path onto the region of interest via a tissue portion of the subject's body located at a distance z from the region of interest, said tissue portion operating as a scattering medium producing a primary speckle pattern forming encoded speckled illumination of the region of interest, said primary speckle pattern having a smallest speckle sized determined as λz/D wherein λ is a wavelength of the coherent light beam, and D is a spot size of projection of the coherent light beam onto the scattering medium; collecting a light response of the region of interest to said encoded speckled illumination; and creating a diffraction limited image of the region of interest on a detector array;

while performing said projecting of the coherent light beam onto the region of interest, sequentially displacing the general propagation path of the coherent light beam, thereby providing a plurality of M laterally displaced encoded illuminations on a region of interest plane characterized by substantially constant appearances of the primary speckle pattern $E_m$ (m=1, . . . M), causing sequential creation, on the detector array, of a corresponding plurality of M diffraction limited images $R_m$ having substantially same primary speckle pattern $E_m$, and generating a plurality of M image data pieces indicative of said plurality of the diffraction limited images $R_m$, thereby enabling super-resolution reconstruction of an image S(x) of the region of interest from the plurality of said image data pieces.

BRIEF DESCRIPTION OF THE DRAWINGS

The patent or application tile contains at least one drawing executed in color. Copies of this patent or patent application publication with color drawings will be provided by the Office upon request and payment of the necessary fee.

In order to better understand the subject matter that is disclosed herein and to exemplify how it may be carried out in practice, embodiments will now be described, by way of non-limiting examples only, with reference to the accompanying drawings, in which:

FIGS. 7A and 7B show Fourier transform of the region of interest and of the encoded structure respectively; FIG. 7C shows the result of convolution procedure between the spectrum of the region of interest and the encoded structure; and FIG. 7D illustrates the recursive procedure;

FIGS. 8A to 8D exemplify the technique of the present disclosure by simulating the reconstruction in space domain of a random space limited object; wherein FIG. 8A shows the original object; FIG. 8B shows the low-resolution object; FIG. 8C shows the super-resolved object; and FIG. 8D shows a comparison of the original signal with the low-resolution and the super-resolved signal in the region where the original signal exists;

FIGS. 9A to 9E show the results of spectral simulations of the object shown in FIGS. 8A to 8D; wherein FIGS. 9A to 9E show respectively the normalized spectral distributions of the original object (FIG. 9A); the low-resolution object (FIG. 9B); the super-resolved object (FIG. 9C); the original encoded structure (FIG. 9D); and the reconstructed encoded structure (FIG. 9E);

FIG. 10B shows the low-resolution image; and FIG. 10C shows the super-resolved reconstruction;

FIGS. 11A to 11F show experimental results using the technique of the disclosure where a USAF resolution target containing three lines with resolution of 4 lp/mm was imaged; wherein FIG. 11A shows the original object; FIG. 11B shows the low-resolution image of the object obtained using a digital low-pass filter; FIG. 11C shows the super-resolved reconstructed object; FIG. 11D shows the original object's spectrum; FIG. 11E shows the low-resolution spectrum; and FIG. 11F shows the super-resolving spectrum; and FIGS. 12A to 12D show an example of imaging three lines of a resolution target using the technique of the disclosure, compared with imaging using a diffraction-limited imaging arrangement; wherein FIGS. 12A and 12B show, respectively, a cross section (FIG. 12A) and the full image (FIG. 12B) of a super-resolved image and FIGS. 12C and 12D show, respectively, the cross section (FIG. 12C) and the full image (FIG. 12D) of the low-resolution image obtained with a diffraction-limited imaging arrangement.

DETAILED DESCRIPTION OF EMBODIMENTS

Figure 1:
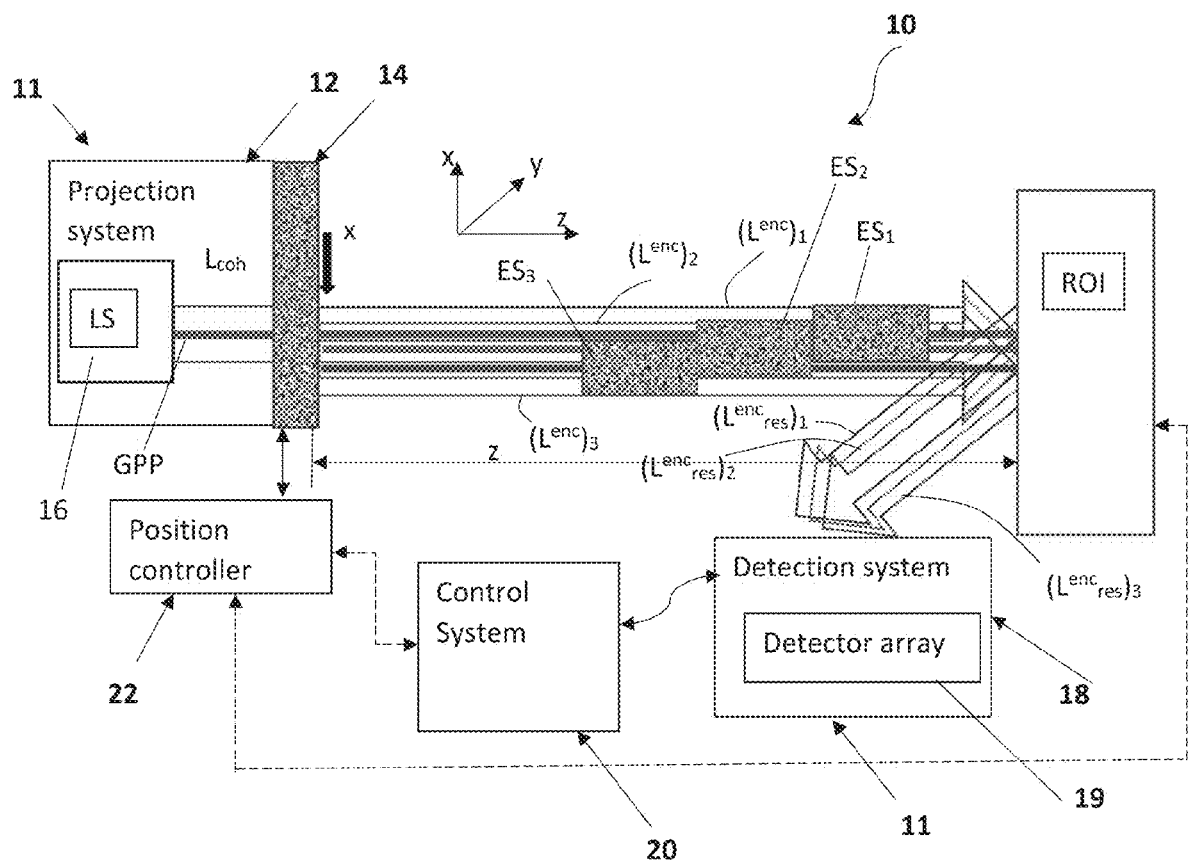
FIG. 1 schematically illustrates an exemplary imaging system configured and operable according to the technique of the present disclosure.

Referring to FIG. 1, there is schematically illustrated, by way of a block diagram, an imaging system 10 configured and operable according to the technique of the present disclosure for imaging a region of interest ROI. According to the approach of the present disclosure, the imaging system 10 is configured for imaging an ROI located "behind" a scattering medium (generally, behind a spatial light encoder).

The imaging system 10 includes an imaging arrangement 11 which typically has a characteristic diffraction limited resolution and includes a projection system 12 and a detection system 18. The imaging system 10 further includes a position controller 20 associated with the projection system 12 and/or region of interest ROI, as will be explained further below.

The imaging system 10 is associated (i.e., includes or is connectable to) a control system 22. The control system 22 is typically a computerized system which is connectable (via wires or wireless connection of any known suitable type) to the output of the detection system, and may also be connectable to (or in data communication with) the position controller 20.

The projection system 12 includes a light source LS producing a monochromatic coherent light beam of wavelength λ and may also include a light directing optics, e.g., lens unit. It should be noted, although not specifically shown, that the detection system 18 may be properly equipped with lens units (generally, imaging optics).

The projection system 12 further includes a spatial light encoder 14 located in the general propagation path GPP at a distance z from the region of interest ROI. The projection system 12 is configured to project a coherent light beam $L_{coh}$ onto the spatial light encoder 14 with a projection spot size D.

The spatial light encoder is selected such that it has a patterned structure of high spatial frequency of pattern features (i.e., embedding spatial high-resolution information of the encoding structure). It should be noted, and is also described above, that the configuration is such that the projection spot size D covers a pattern of the encoder with highly dense pattern features. Typically, any spatial light modulator can easily be selected to satisfy this requirement. Moreover, when using a scattering medium as a spatial encoder this condition is satisfied for any size D without specific selection of the encoder's pattern.

The interaction of the coherent light beam $L_{coh}$ with the spatial light encoder 14 produces a light field of an encoded structure E thereby providing encoded illumination $L^{enc}$ of the region of interest. Considering the use of scattering medium, such encoded illumination is in the form of a primary speckle pattern.

The position controller 20 is configured and operable to sequentially provide relative displacements (angular displacements and/or lateral displacements along x- and/or y-axis), between the general propagation path GPP and the region of interest plane ROI. Such relative displacements result in the input light interaction with segments of the spatial encoder ($ES_1, ES_2, ES_3 \ldots$) producing a plurality of sequential encoded illuminations laterally displaced from one another in the region of interest plane—three such encoded illuminations $(L^{enc})_1$, $(L^{enc})_2$ and $(L^{enc})_3$ being shown in the figure. The laterally displaced encoded illuminations include a plurality of M encoded illuminations laterally displaced between them such that they are characterized by substantially same appearance of the encoded structures. This will be described more specifically further below. The encoded illuminations cause corresponding encoded light responses of the region of interest—three such responses being shown in the figure $(L^{enc}_{res})_1$, $(L^{enc}_{res})_2$, $(L^{enc}_{res})_3$.

The detection system 18 is positioned at a certain fixed location with respect to the region of interest ROI and includes a detector array 19. The detection system (e.g., camera) is configured for collecting the sequence of the light responses from the region of interest and creating a corresponding sequence of diffraction limited images of the region of interest ROI on the detector array 19.

As described above, certain super-resolution to be obtained is defined by the smallest feature size d of the encoded illumination at the region of interest plane. This parameter d is defined, depending on whether the imaging arrangement is configured using Fourier-based configuration (i.e. the encoder is in a Fourier plane or plane conjugate thereto with respect to the region of interest plane) or an imaging configuration inducing a magnification factor.

For the Fourier-based configuration, the smallest feature size d of the encoded illumination al the region of interest plane is determined as $$d = \frac{\lambda z}{D},$$

where $\lambda$ is the wavelength of the coherent light beam, z is a distance between the encoder and region of interest planes, and D is a spot size of the coherent beam projection on the spatial light encoder plane. For the imaging configuration, the smallest feature size d of the encoded illumination at the region of interest plane is determined as $d=d_0 M_f$, where $d_0$ is the smallest feature size of a pattern of the spatial light encoder and $M_f$ is the magnification factor.

In order to obtain the desired lateral displacement of the encoded illuminations in the region of interest plane, the position controller operates to implement "physical displacement" between the general propagation path and the region of interest. This depends on whether the imaging arrangement utilizes the Fourier-based configuration or the imaging configuration. For the Fourier-based configuration, the displacement/shift $\delta x$ (and/or $\delta y$) can be achieved by an angular displacement $\alpha$ of the general propagation path, which, in turn, is determined in accordance with the required smallest super-resolution (i.e. the smallest feature size d of the encoded illumination at the region of interest plane) and the distance z between the encoder and region of interest planes, i.e., $\tan \alpha = \delta x/z$. For the imaging configuration, the displacement/shift $\delta x$ (and/or $\delta y$) of the encoded illumination at the region of interest plane is achieved by the physical relative lateral displacement $\delta x'$ which is determined as $\delta x' = \delta x \, M_f$.

Generally, in order to obtain substantially constant appearances of the encoded structure in the region of interest plane for the displaced encoded illuminations, the value of the displacement/shift of the encoded illumination $\delta x$ (and/or $\delta y$) in the region of interest plane is to be proportional to a fraction of the value of the smallest feature d. For example, $\delta x$ may be smaller or equal (preferably smaller) than d, i.e. $\delta x < d$, or $\delta x = Cd + Bd$, where C is integer $C \geq 1$, and $0 < B < 1$.

Thus, the physical displacements are such that the sequence of the encoded illuminations laterally displaced in the region of interest plane includes a plurality of M encoded illuminations of substantially constant appearances of the encoded structure $E_m$ of the light field, resulting in a corresponding plurality of M diffraction limited images. Since the region of interest ROI is assumed to be unchanged in time during the sequence of imaging sessions, this configuration provides time multiplexing image detection. The detector array 19 provides output measured data indicative of a corresponding sequence of image data pieces.

For example, as mentioned above, the spatial encoder may be a scattering medium such that interaction of light with the scattering medium produces a primary speckle pattern. In this case, the spatial resolution is of the order of the smallest speckle size a' (i.e., the smallest feature size of the encoded illumination at the region of interest plane), which is defined as $\lambda z/D$, where $\lambda$ is a wavelength of the coherent light beam and z is a distance from the recording medium to the region of interest and can thus be properly controlled.

The position controller 20 is operable to provide controllable relative displacements between the general propagation path GPP and the region of interest ROI thereby interacting the incident light beam $L_{coh}$ with different segments of the spatial encoder 14. As indicated above, the displacements are such that they include a plurality of M predetermined displacements providing M encoded illuminations laterally displaced between them at $\delta x$ (and/or $\delta y$) characterized by substantially constant appearance of the encoded structures $E_m$ of the light field.

Measured data provided by detector array 19 of the detection system 18 includes the corresponding plurality of image data pieces detected over time $IDP_m(t)$. The technique of the present disclosure, utilizing the above displacements, enables super-resolution reconstruction of an image S(x)/S(y) or S(x,y) of the region of interest ROI from the plurality of data pieces $IDP_m(t$, without prior knowledge of the encoded structure of the light field. These image data pieces are indicative of M diffraction limited images $R_m$ corresponding to the detected light responses of the image of interest to the plurality of M encoded illuminations having the same (constant) appearance of the encoded structures $E_m$ of the light field.

To this end, the plurality of the M lateral displacements $\delta x$ in the region of interest plane provided by operation of the position controller 20 satisfy a condition that $\delta x < d$ or $\delta x = Cd + Bd$, where C is integer $C \geq 1$, and $0 < B < 1$. In this connection, it should be noted that, practically, the sequence of displacements may include many displacements that do not satisfy this condition. The position controller 20 and the detection system 18 operate in a synchronous mode to provide, to the control system 22, measured data $IDP_m(t, \delta x)$ including image data pieces assigned with data indicative of their corresponding displacements. The control system 22 is configured and operable to identify, in the received measured data, and select for further analysis the "relevant" image data pieces, whose assigned displacements satisfy the above condition.

Each image data piece corresponds to the diffraction limited image detected by the detector array and presents a product of spatial information (image) of the region of interest $S_m(x)$ with that of the encoded structure $E_m$. Since for the selected "relevant" image data pieces the encoded structure $E_m$ is the same, this enables the reconstruction of the image of the region of interest $S_m(x)$ without the prior knowledge of the encoded structure $E_m$, by processing the plurality of M image data pieces, as will be described more specifically further below. Since the encoding structure has a required high spatial resolution, the reconstructed image has a corresponding super-resolution higher than the characteristic diffraction limited resolution of the imaging arrangement.

It should be understood that the spatial encoder may be transmitting or reflective with respect to the incident light $L_{coh}$. The encoder is located upstream of the region of interest with respect to the general propagation direction of the input coherent light, which is true for both configurations, i.e., transmitting and reflection modes. Hence, although FIG. 1, as well as FIGS. 2, 3 and 4, exemplify the transmitting mode, it should be understood that the principles of the present disclosure are not limited to these specific examples.

Figure 2:
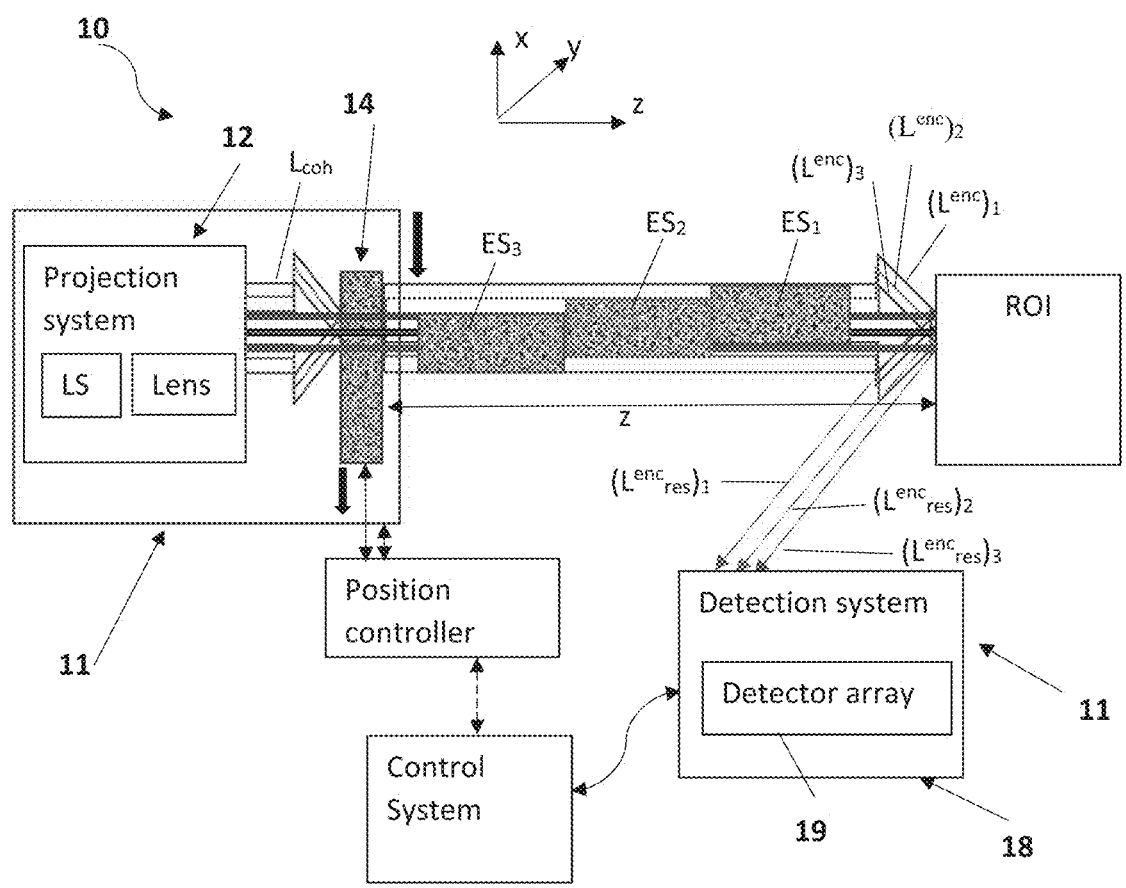
FIGS. 2 and 3 schematically illustrate two specific but not limiting examples, respectively, of the imaging system according to the technique of the present disclosure.
Figure 3:
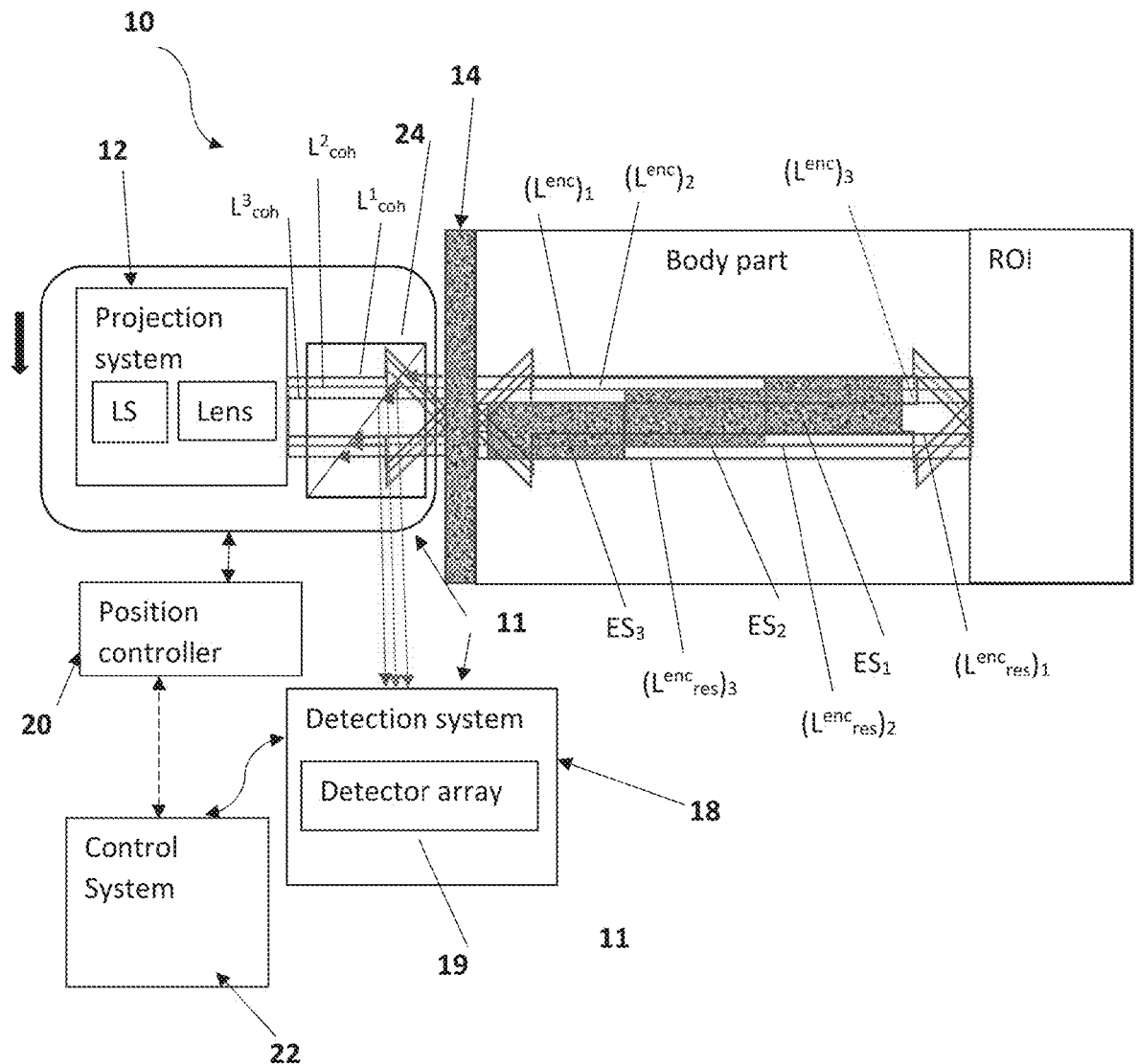
Figure 4:
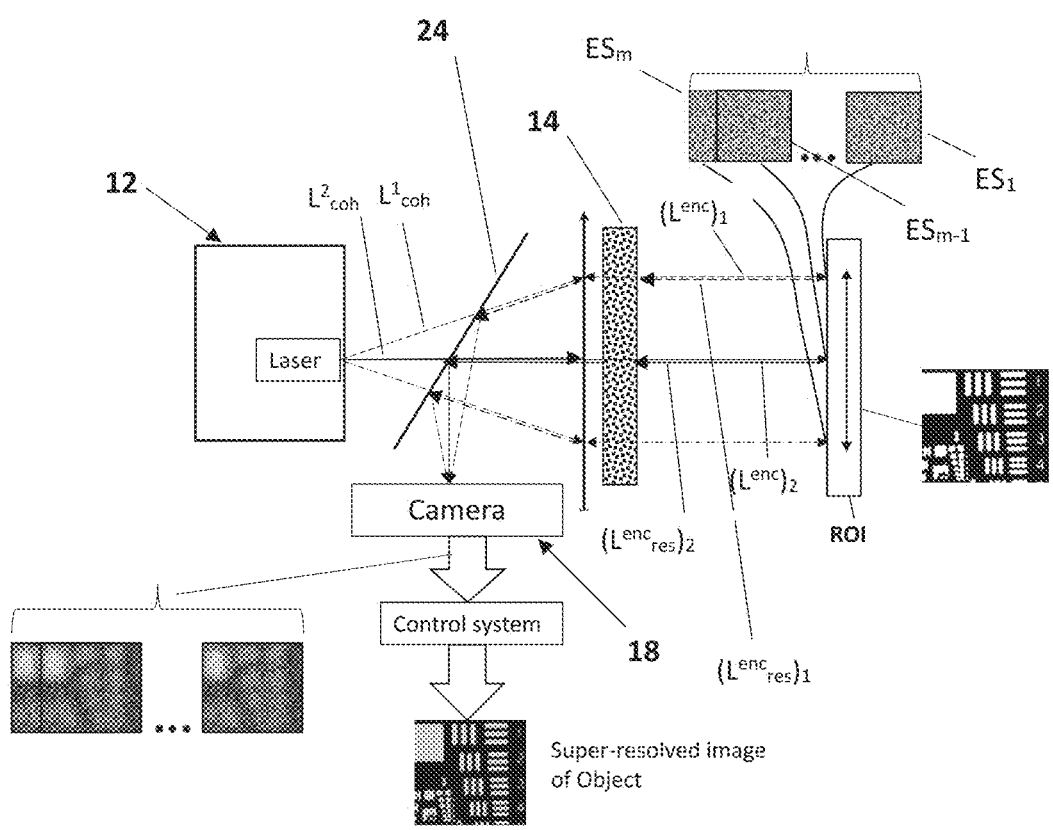
FIG. 4 more specifically illustrates light propagation scheme and image formation stages in an exemplary imaging system according to the technique of the present disclosure.

Further, it should be noted that the detection system 18 may be accommodated to be directly exposed to the light response $L^{enc}_{res}$ of the region of interest, as exemplified in FIGS. 1 and 2, or may be accommodated to receive the light response after passing back through the spatial encoder, as exemplified in FIGS. 3 and 4.

To facilitate understanding, the same reference numbers are used in all the examples to identify the components (functional components) that are similar in all the examples.

As described above, the position controller 20 is configured and operable to provide relative displacement (angular and/or lateral) between the general propagation path GPP and the region of interest ROI. This can be achieved by moving the entire projection system 12 including the spatial encoder 14 or moving only the spatial encoder 14 at the output of the projection system.

It should be noted that considering the spatial encoder in the form of scattering medium, interaction of input light with the scattering medium produces encoded light field containing a primary speckle pattern. The constant appearance of the primary speckle patterns in the illuminations resulting from angular displacements of the general propagation path satisfy the above condition for lateral displacements $\delta x$ and/or $\delta y$ with respect to the value of d in the region of interest plane, can be obtained by angular scan of the general propagation path. The constant appearance of the primary speckle pattern is maintained due to a so-called "memory effect" guaranteed by the above condition of the lateral displacement factor $\delta x$.

FIG. 2 shows an exemplary imaging system 10 configured generally similarly to the system of FIG. 1 but exemplifying specifically that the position controller 20 is associated only with the projection system 12 (and not with the region of interest which is kept static during imaging sessions). As shown in the figure, the position controller 20 is connected to and displaces the entire projection system 12 or only its spatial encoder 14, as the case may be. Here, (as well as in the example of FIG. 1), the spatial encoder 14 may be a patterned structure (like SLM) or a scattering medium FIG. 3 shows an exemplary imaging system 10 configured similarly to the system of FIG. 2 (in that the region of interest is static) but exemplifying specifically that the detection system 18 is exposed to the light response after its passage back through the spatial encoder 14. To this end, the imaging arrangement 11 (e.g., the projection system 12) further includes a beam splitter 24 which transmits (or reflects) the input light $L_{coh}$ towards the scattering medium 14 and reflects (or transmits) the light response $L^{enc}_{res}$ towards the detection system 18.

This example of FIG. 3 is suitable for super-resolution imaging of the region of interest ROI inside a subject's body part (for example imaging of bones), where the spatial encoder 14 is the scattering medium constituted by the surface tissue portion of the body part. Hence, the scattering medium 14, as well as region of interest ROI, are static and what is displaced is the light source unit of the projection system. As described above, the constant appearance of the primary speckle pattern in different diffracted limited images is maintained due to the "memory effect".

It should be noted that the "physical" displacement implemented by the position controller may include angular displacement of the general propagation path of the coherent light beam. This is more suitable when using a scattering medium as the spatial light encoder. Such angular displacements $\alpha$ of the general propagation path results in lateral displacements $\delta x$ (and/or $\delta y$) of the encoded illumination on the region of interest plane. The angular displacement is selected to provide desired lateral displacement of the order of the smallest feature d of the encoded illumination projection on the region of interest plane (i.e., $\delta x \approx d$) and is determined from: $\tan \alpha = \delta x / z$.

FIG. 4 shows more specifically some features of the configuration and operation of the system 10 of the present disclosure. As shown in the figure in the self-explanatory manner, the spatial encoder 14 may be configured as a scattering medium, and interaction of the coherent light beam $L_{coh}$ with the scattering medium produces a primary speckle pattern. In this example, the sequence of imaging sessions is implemented by displacement (typically angular displacement) of the light propagation path from the light source (e.g., laser) providing the x- and/or y-axis lateral displacements of the encoded illuminations in the region of interest plane.

As shown in the figure (which is true for all the above-exemplified configurations), the image data pieces IDP(t) provided by the detection system 18 (camera) are low-resolution images (defined by the diffraction limited optics of the imaging arrangement). Image processing performed by the control system 22 provides super-resolution reconstructed image of the region of interest $S(x)$.

In the following, the principles of the imaging technique of the present disclosure are more specifically presented.

Figure 5:
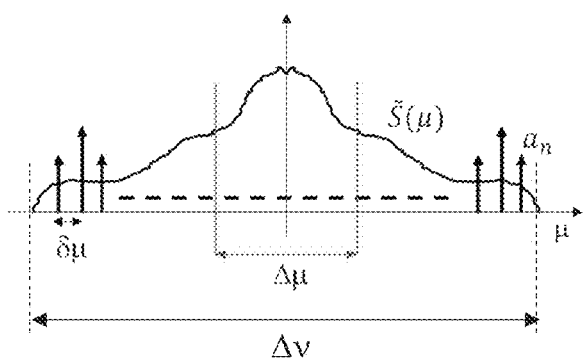
FIG. 5, exemplifies a spatial frequency representation (spectrum) $\tilde{S}(\mu)$ of a region of interest whose image S(x) is to be reconstructed for the full spectral bandwidth Δν, μ being a spatial frequency.

Reference is made to FIG. 5, exemplifying a spatial frequency representation (spectrum) $\tilde{S}(\mu)$ of a region of interest whose image $S(x)$ is to be reconstructed for the full spectral bandwidth $\Delta v$, $\mu$ being a spatial frequency. Here, $\Delta \mu$ is the spectral bandwidth obtainable from the diffraction limited resolution (low resolution) of the imaging arrangement at each imaging session. Typically, $\Delta \mu < \Delta v$, limiting the ability to reconstruct the image for full spectral bandwidth.

It is assumed that the encoding structure E (whose appearance is the same in the selected image data pieces as described above) has periodicity in space and therefore may be expressed as a Fourier series of Dirac delta functions with spectral spacing of $\delta \mu$, where $\alpha_n$ are the Fourier series' coefficients of the corresponding delta functions.

The spectrum $\tilde{S}(\mu)$ also has a frequency resolution given by the inverse of the spatial extent of the region of interest. Assuming that the region of interest has spatial dimensions of $\Delta x$, the spectral resolution is:

$$\delta v = 1/\Delta x \quad (1)$$

If, for example, $\delta v = \delta \mu$, then the periodicity assumption with respect to the encoding function is not needed as it means that the spatial period of the encoding function's periodicity equals to the finite dimensions of the inspected region of interest.

The technique of the present disclosure is aimed at performing super-resolution image reconstruction to detect the full spectral bandwidth $\Delta v$ of the region of interest, while the encoding function E is unknown.

It should be noted that, typically, the condition that $\delta v = \delta \mu$ might be preferred, as the spectral resolution of the encoding function would be not smaller than the spectral resolution of the region of interest. In general, $\delta \mu$ may be defined as the reciprocal of the spatial size of the encoding function E. Therefore, the condition $\delta v = S \mu$ describes those cases where the spatial extent of the encoding function is the same, as the spatial extent of the region of interest $\Delta x$.

For example, in case the spatial encoder is in the form of a scattering medium, the encoding structure is a primary speckle pattern, and the spectral resolution $\delta \mu$ is determined by smallest speckle size d at the region of interest plane, determined as $\delta z/D$. Hence, the spectral resolution can be controlled by selection of the distance z from the recording medium to the region of interest and the spot size D of the input light beam projection on the spatial light encoder.

Figure 6:
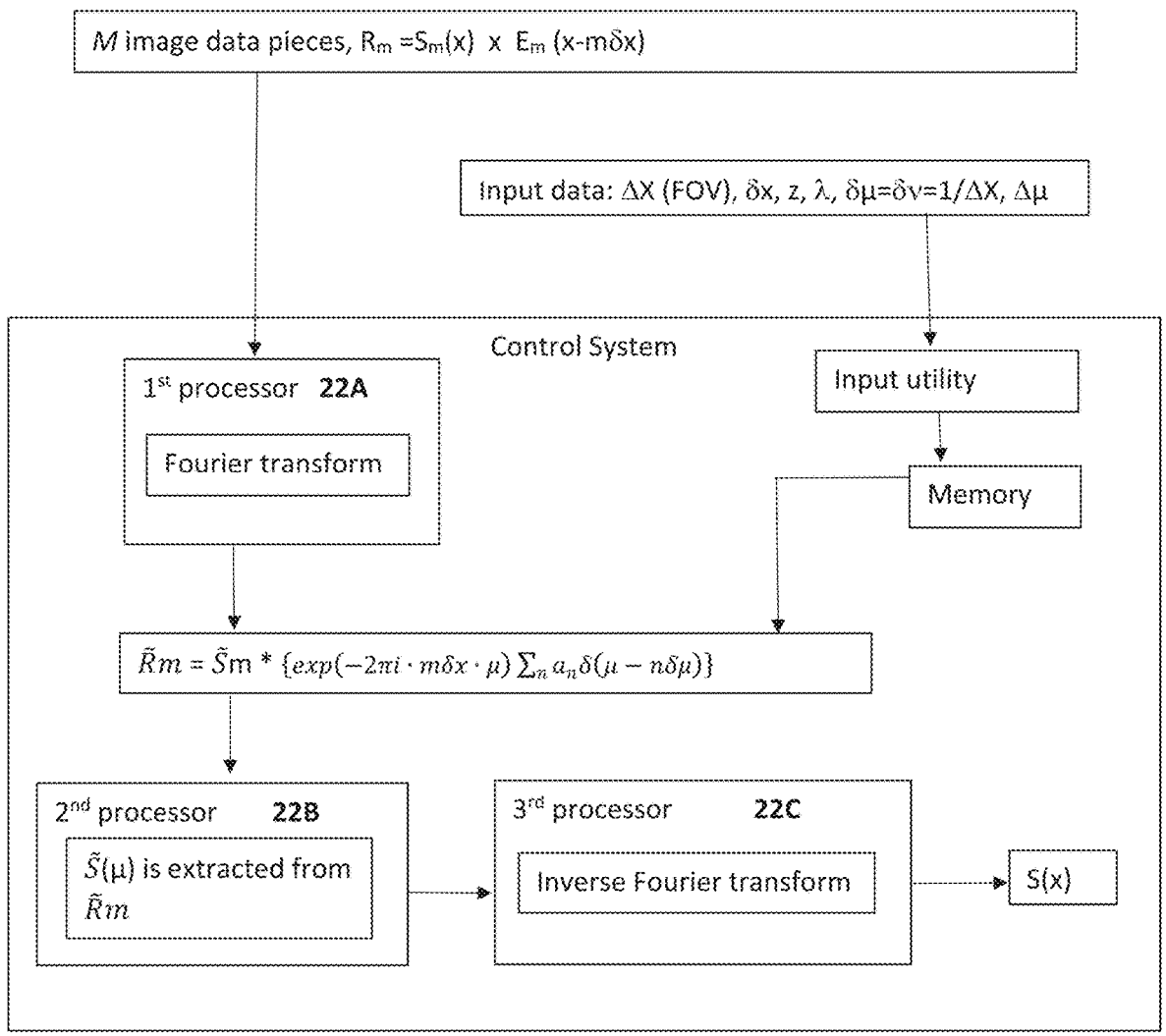
FIG. 6 exemplifies a flow diagram of the data processing (image reconstruction) utilized in the technique of the present disclosure.

Without loss of generality, 1-D analysis will be used in the description below for the sake of simplicity with reference to FIG. 6 showing a flow diagram of the data processing technique performed by the control system 22 according to the present disclosure.

The technique of the present disclosure involves capturing M low resolution images (diffraction limited images) where the displacement/shift $\delta x$ of the encoded illuminations in the region of interest plane provides each two subsequently captured encoded diffraction limited images. Thus, selected plurality of M encoded diffraction limited images, related to the region of interest and the encoded structure, are recorded as follows:

$$R_m = S_m(x) \cdot E_m(x - m\delta x), \quad (2)$$

where R denotes the detected image, $S_m(x)$ is the image of the region of interest to be extracted, and $E_m$ is the encoding function of the encoded structure.

The control system 22 includes a first processor 22A processing the input data $R_m$ defined in Eq. (2) above by applying Fourier transform thereto, making use of the convolution and shift theorems:

$$\tilde{R}_m(\mu) = \tilde{S}_m * \{\exp(-2\pi i \cdot m\delta x \cdot \mu) \Sigma_n a_n \delta(\mu - m\delta \mu)\} \quad (3)$$

Then, a second processor 22B of the control system operates to extract $\tilde{S}(\mu)$ from $\tilde{R}_m$. This is performed as follows:

Taking in account the fact that the imaging arrangement is bandlimited to $\Delta \mu$, equation (3) is also band limited consequently. As a result, after performing the convolution, the set of image data pieces can be expressed by the following equation:

$$\tilde{R}_m(\mu) = \left( \sum_{n=-N/2}^{+N/2} a_n \exp(-2\pi i \cdot m\delta x \cdot n\delta \mu) \tilde{S}(\mu - n\delta \mu) \right) rect\left(\frac{\mu}{\Delta \mu}\right) \quad (4)$$

wherein $$N = \eta(\Delta \mu / \delta \mu) \quad (5)$$

where $\eta$ is the super-resolution factor i.e., a ratio between the spectral width of the spectrum of the region of interest $\Delta v$ and the spectral bandwidth obtainable from the diffraction limited resolution $\Delta \mu$. In other words, N is determined by the ratio between the spectral width of the spectrum of the region of interest $\Delta v$ and the spectral resolution of the encoding function $\delta \mu$ and reflects the number of required reconstructed spectral signatures for a given spectral content of the region of interest.

In addition, the number of equations, each corresponding to different amount of spatial shifting $m\delta x$ can be calculated as follows:

$$M = \frac{\eta \Delta \mu (1/\delta v + 1/\delta \mu)}{\Delta \mu / \delta v} = \eta(1 + \delta v / \delta \mu) \quad (6)$$

In case that the encoding function is not periodic, i.e., $\delta v = \delta \mu$, equation (6) becomes $M = 2\eta$.

In order to solve the sot of equations described by Eq. (4) it will be written in matrix representation by using the following notations:

$$\tilde{S}_n(\mu) = \tilde{S}_n(\mu - n\delta \mu) rect\left(\frac{\mu}{\Delta \mu}\right) \quad (7)$$

$$A_{m,n} = a_n \exp(-2\pi i \cdot m\delta x \cdot n\delta \mu)$$

$$\tilde{R}_m(\mu) = \sum_n A_{m,n} \tilde{S}_n(\mu)$$

Thus, Eq. (4) may be written in a matrix form:

$$\begin{bmatrix} \cdots \\ A_{m,n} \\ \cdots \end{bmatrix}_{M \times N} \begin{bmatrix} \vdots \\ \tilde{S}_n \\ \vdots \end{bmatrix}_{N \times 1} = \begin{bmatrix} \vdots \\ \tilde{R}_m \\ \vdots \end{bmatrix}_{M \times 1} \quad (8)$$

where the unknown matrix $A_{m,n}$, can be expressed as a product between a known matrix and a diagonal unknown matrix of $a_n$ coefficients:

$$\begin{bmatrix} \cdots \\ A_{m,n} \\ \cdots \end{bmatrix}_{M \times N} = \begin{bmatrix} \cdots \\ \exp(-2\pi i \cdot m\delta x \cdot n\delta \mu) \\ \cdots \end{bmatrix}_{M \times N} \begin{bmatrix} a_1 & 0 & 0 \\ 0 & a_2 & 0 \\ 0 & 0 & a_n \end{bmatrix}_{N \times N} \quad (9)$$

The matrix of the exponents is invertible since its rows are independent, and thus, the desired reconstruction is obtained as:

$$\begin{bmatrix} a_{-N/2} & 0 & 0 \\ 0 & a_n & 0 \\ 0 & 0 & a_{N/2} \end{bmatrix}_{N \times N} \begin{bmatrix} \vdots \\ \tilde{S}_n \\ \vdots \end{bmatrix}_{N \times 1} = \begin{bmatrix} \cdots & & \\ & \exp(-2\pi i \cdot m\delta x \cdot n\delta\mu) & \\ & & \cdots \end{bmatrix}^{-1} \begin{bmatrix} \vdots \\ \tilde{R}_m \\ \vdots \end{bmatrix} \quad (10)$$

The right side of Eq. (10) is known, while the left side is unknown. It is important to note that although in the left as well as in the right side of Eq. 10 the result is expressed as an N×1 vector, both sides of the equation are actually matrices since every component of the N×1 vector is a vector by itself depending on the spectral coordinate µ. The case with less redundancy, i.e., the case with the largest number of unknowns, is accomplished when δv=δµ. In such situation, the following relation is fulfilled:

$$\tilde{S}_n(k\delta\mu) = \tilde{S}_{n-1}((k-1)\delta\mu) + \tilde{S}_n(-N/2\delta\mu) - \tilde{S}_{n-1}(N/2\delta\mu) \quad (11)$$

where µ=kδµ and k goes from −N/2 to N/2 exactly as n.

It should be noted that in order to make the matrix of the right wing of Eq. (10) invertible it needs to be a square matrix (condition that is accomplished, as its rows are independent, and it is full rank), which means that the matrix satisfies a condition: M=N.

The processor 22B performs recursive procedure in order to extract the unknown $\tilde{S}(\mu)$ using the known relationship between pairs of the Fourier series' coefficients $a_n$ forming the matrix on the left side of equation (10) and the recursive relationship between the consecutive spectra $\tilde{S}_n$ appearing in the matrix of equation (11).

Figure 7A:
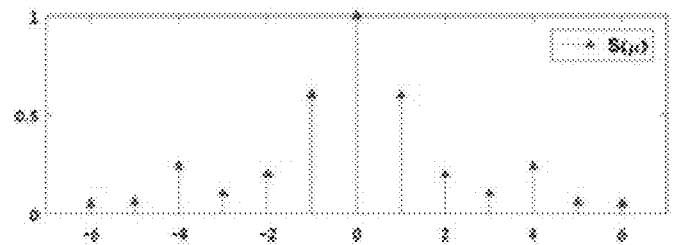
FIGS. 7A to 7D illustrate the principles underlying the image reconstruction procedure, where
Figure 7B:
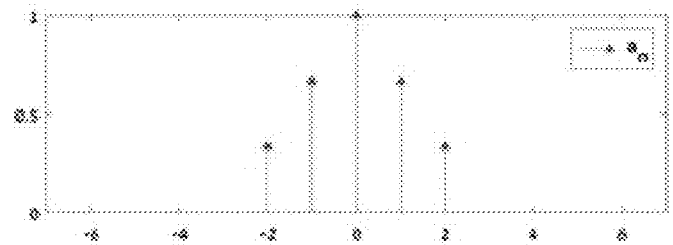
Figure 7C:
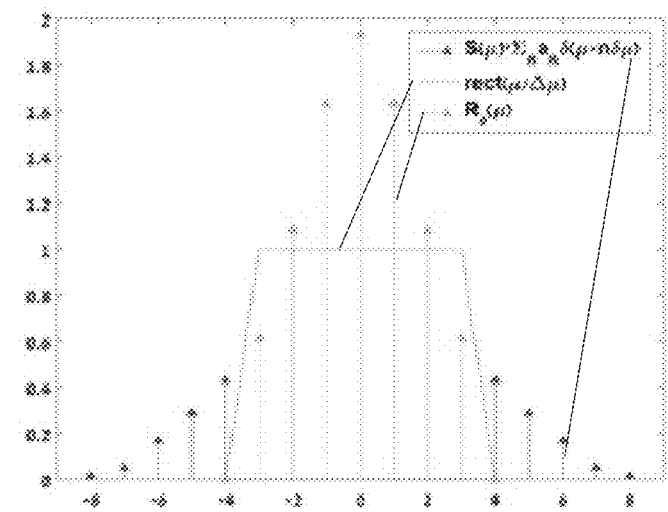
Figure 7D:
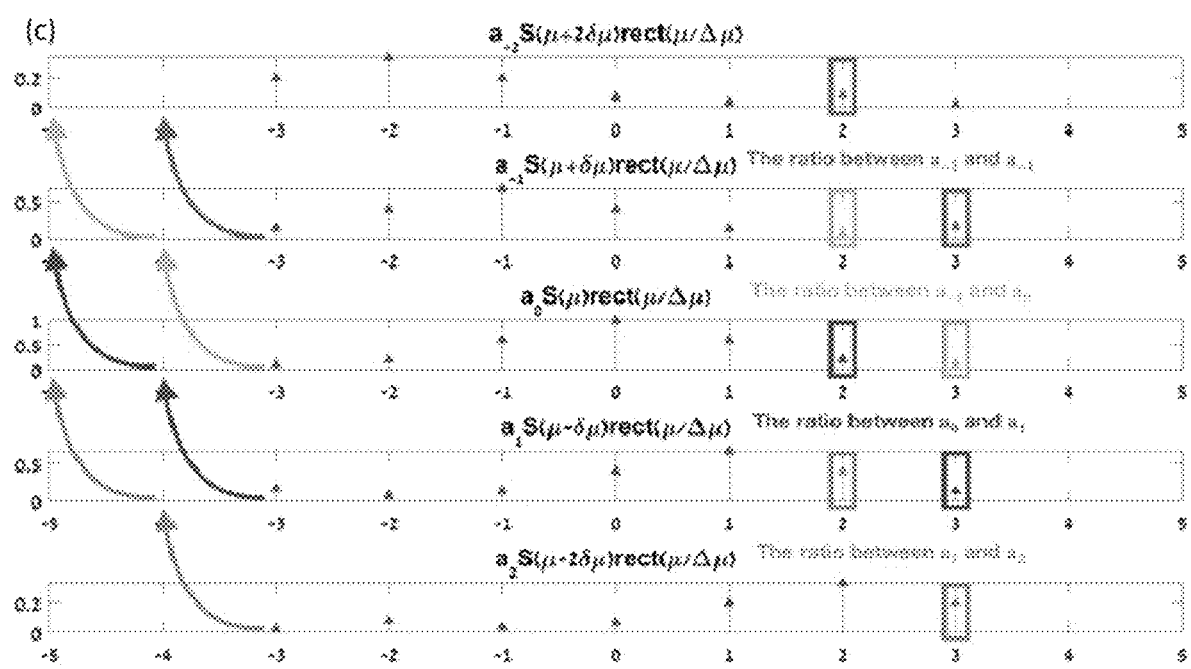

In this connection, reference is made to FIGS. 7A-7D, where FIGS. 7A and 7B show the Fourier transform $\tilde{S}_m$ of the region of interest and the Fourier transform of the encoded structure $\tilde{E}_m$, respectively; FIG. 7C shows the convolution result between the spectrum of the region of interest and the encoded structure taking into account the band limited effect of the imaging arrangement $$rect\left(\frac{\mu}{\Delta\mu}\right)$$

as described above in equation (4) operating as the low-pass filter, and image $R_0(\mu)$ i.e. without the displacement/shift; and FIG. 7D Illustrates the recursive procedure that can be done after Eq. (10).

Thus, the procedure starts by looking at row number 'i', which represents the spectrum that was shifted by $$\left(-\frac{N}{2} + i - 1\right)\delta\mu,$$

and was multiplied by $$a_{-\frac{N}{2}+i-1}.$$

Accordingly, the spectrum has to be multiplied by the lowpass filter (LPF), and therefore, this row will be:

$$a_{-\frac{N}{2}+i-1}\tilde{S}\left(\mu - \left(-\frac{N}{2} + i - 1\right)\delta\mu\right)rect\frac{\mu}{\Delta\mu},$$

by the same way the 'i+1' row will be $$a_{-\frac{N}{2}+i}\tilde{S}\left(\mu - \left(-\frac{N}{2} + i\right)\delta\mu\right)rect\frac{\mu}{\Delta\mu},$$

There are $$\frac{\Delta\mu}{\delta\mu}$$

elements that can pass the LPF, and because there is a difference of one δµ shift between two consecutive rows in the matrix, each pair of consecutive rows in the matrix of the left side of Eq. (10) will be the same, to the point of the multiplication permanently $$a_i/a_{i+1}, \text{ at } \frac{\Delta\mu}{\delta\mu} - 1$$

elements. It should be noticed that because of the shifting difference, the same spectrum elements will be at different places in each row. Each one of the rows swill have one extra different component, and from the connection between the known components the connection between $a_i$ and $a_{i+1}$ can be obtained.

FIGS. 7A and 7B show samples of the spectrum of the region of interest S(µ) and the Fourier series components of the encoder $a_n$. FIG. 7C shows the resulting image spectrum after convolution and simulation of passing through the lens. The image shown in FIG. 7C is $R_0(\mu)$ because this image is without the spatial shifting/displacement of the encoder. FIG. 7D shows the left side matrix of Eq. (10) after capturing M low resolution images. The elements surrounded by rectangles of the same color represent the same elements of the spectrum and are used to determine the connection between $a_i$ and $a_{i+1}$.

After the relation, e.g., ratio, between $a_i$ and $a_{i+1}$ is found, one can continue combining between every other pair of rows to determine a wider spectrum. The process is exemplified in FIG. 7C, where the first two subplots (from the top of the figure) represent the first two rows in the left side matrix of Eq. (10). The elements marked in orange represent the same spectrum element and provide the ratio between $a_{-2}$ and $a_{-1}$. This ratio can be used to add the additional element from the second row to the first row, since one of the coefficients is known $$\left(a_{-\frac{N}{2}}\right.$$

is assumed to be equal to 1), as well as the ratio. The same way the element from the third row can be added to the second by the yellow connection and after that it can be added to the first row by the orange connection and so on.

In the following a simple example is described, to understand better how the known spectrum can be expanded from two consecutive rows by one element.

Let's assume that $$\frac{\Delta\mu}{\delta\mu} = 7,$$

and, for example, look at me row that represents the spectrum that was multiplied by $a_0$. This is the actual spectrum without shifting and will be in this example denoted $S_{a_0}$. The next row, the one representing the spectrum that was shifted by $\delta\mu$ and was multiplied by $a_1$, will be denoted, $S_{a_1}$. The samples of the original spectrum will be denoted $S(k)$. $S_{a_0}$ and $S_{a_1}$ both have 7 elements:

$$S_{a_0} = a_0[S(-3), S(-2), \ldots, S(2), S(3)], S_{a_1} = {}_1[S(-4),$$
$$S(-3), \ldots, S(1), S(2)].$$

It is known that, for example, the first element in $S_{a_0}$ and the second element in $S_{a_1}$ represent $S(-3)$, that was multiplied by different element in each row. It is possible to calculate $$\frac{S_{a_0}(1)}{S_{a_1}(2)} = \frac{a_0 S(-3)}{a_1 S(-3)} = \frac{a_0}{a_1}$$

and thus obtain the connection between $a_0$ and $a_1$ i.e., $$\frac{a_0}{a_1}$$

which can be calculated from any pair of values representing the same spectrum value.

Next, the following vector is examined:

$$\left[\frac{a_0}{a_1} S_{a_1}(1), S_{a_0}\right] = a_0[S(-4), S(-3), \ldots, S(2), S(3)] = \left[\frac{a_0}{a_1} S_{a_1}, S_{a_1}(7)\right].$$

The process is started at the first and second rows, where it is assumed that $$a_{-\frac{N}{2}} = 1.$$

Then $$a_{-\frac{N}{2}+1}$$

can be found from the connection between the vector's elements as described above, and therefore, another component being the element existing in the second row, but not in the first one, can be found. After that, the process proceeds using the connection between the second and the third rows to find $$a_{-\frac{N}{2}+2}$$

and the component existing in the third row but not in the second row, and so on. Eventually, all the coefficients $a_n$ (relative to $$a_{-\frac{N}{2}}$$

which was assumed to be 1) and all values of $\tilde{S}_n$ can be found, thus providing $\tilde{S}(\mu)$.

Then, the 3rd processor 22C of the control system 22 performs inverse Fourier transform of the spectral representation, $\tilde{S}(\mu)$, to extract the image of the region of interest $S(x)$ along at least the x-axis.

The effect of the unknown pattern that illuminates the region of interest on the above-described process is that the minimum element size that can be seen in the reconstructed image of the region of interest is of the same order as the minimum element size of the encoded structure.

If, for example, the unknown encoder is a scattering medium, the primary pattern of the speckles that illuminates the object is typically unknown. However, the properties of the speckle pattern are known, i.e., the speckle's average dot size. In this case, the minimum element size that can be seen in the region of interest will be equal to the size of the speckle's dots. The minimum element size of the speckle d is given by $$\frac{\lambda z}{D}$$

where $\lambda$ is the wavelength of the illumination, z is the distance between the scattering medium and the region of interest, and D is the spot size/diameter of the input light projection on the spatial light encoder, Note that this size of the speckle will be obtained for the same spot size D on the encoder providing the spectral resolution condition $\delta v = \delta\mu$.

Attention should be drawn to the reconstruction time and the accuracy of the method of the present disclosure. The significant calculation that the method of the disclosure contains is the inverse of the matrix in Eq. (10) (in the right side of the equation). Once the inversion of the matrix is calculated, the rest of the reconstruction calculation is computationally insignificant as it contains in each step a simple calculation of a number of simple mathematical operations. The matrix of the exponents in Eq. (10) may be known before the calculation, if the values that determine the matrix, $\delta x$ and $\delta\mu$, are known in advance, therefore the rest of the reconstruction is fast. In addition, it should be noted that the connection between two consecutive values of 'a' is obtained by the connection between pairs of different values. If an average of different pairs is used the accuracy of the recovered value is increased.

In the following, some numerical simulations of the technique of the present disclosure are described.

Figure 8A:
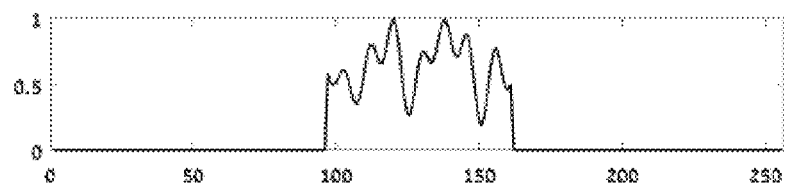
Figure 8B:
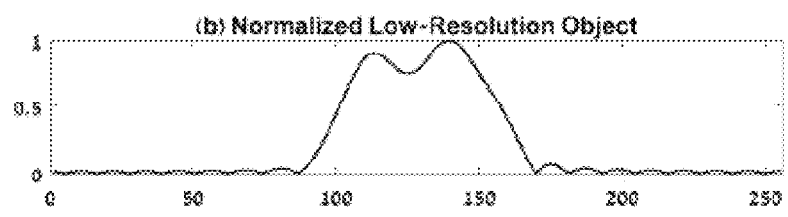
Figure 8C:
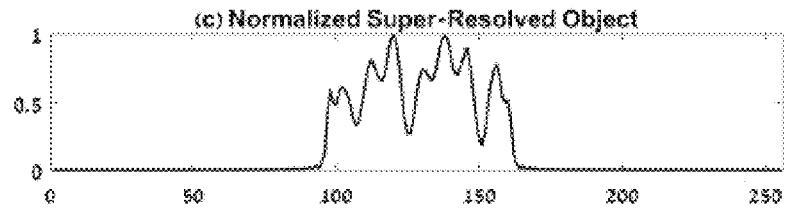
Figure 8D:
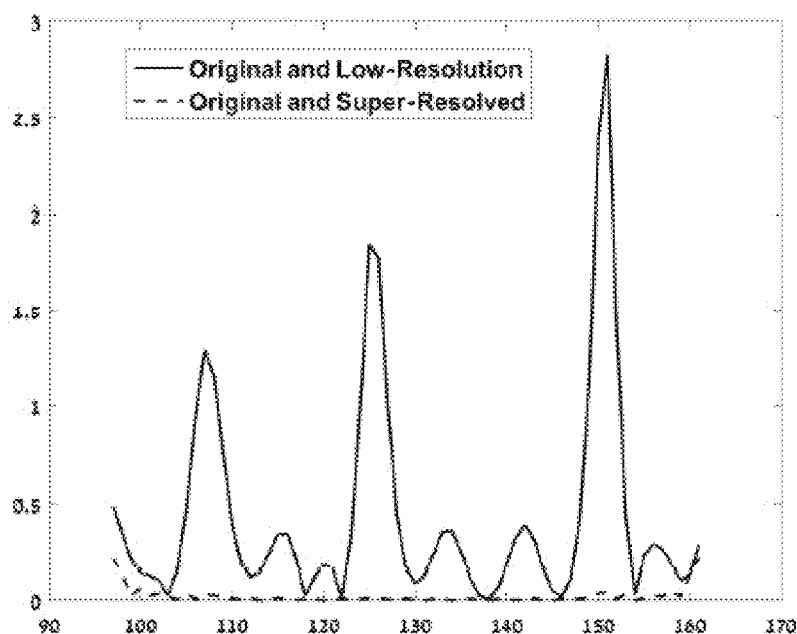

FIGS. 8A-8D show the simulation of the image reconstruction in space domain. It is assumed that the object (region of interest) is a random space limited object with N/4=64 pixels, while in parametric space there are N=256 pixels as shown in FIG. 8A. The low-resolution object is shown in FIG. 8B, and the super-resolved reconstruction obtained when applying the technique of the present disclosure is shown in FIG. 8C. FIG. 8D shows a comparison of the original signal/detected image (denoted "O") with the low-resolution and the super-resolved reconstructed image in the region of the parametric space where the original image exists. The graph shows the absolute value of $$\frac{L-O}{O} \text{ and } \frac{S-O}{O}$$

where O is the original signal/image, L is the low-resolution signal/image and S is the super-resolved signal/image. This comparison indicates that the super-resolved signal/image is much closer to the original one than the low-resolution signal. Note also the Gibbs phenomenon which was created by not taking all the coefficients in the Fourier series which builds the original object.

Figure 9A:
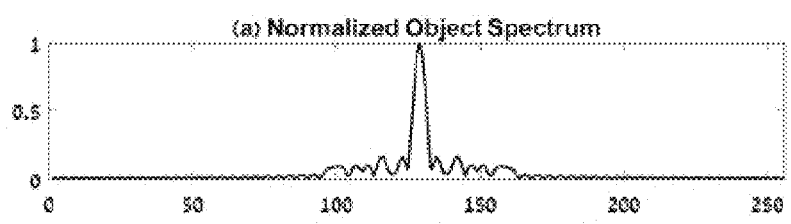
Figure 9B:
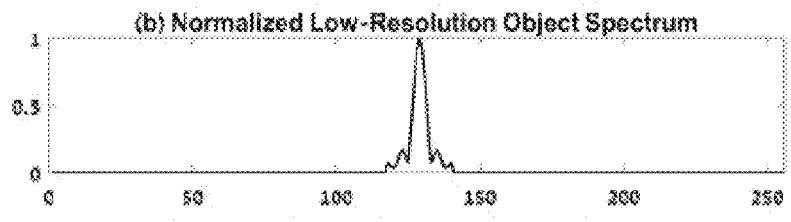
Figure 9C:
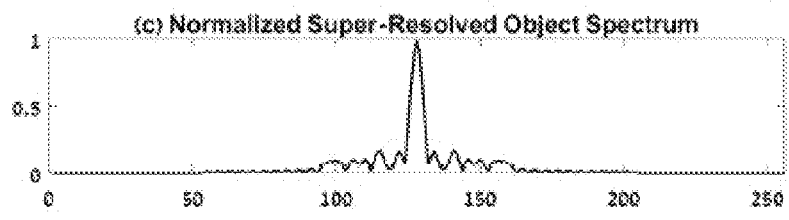
Figure 9D:
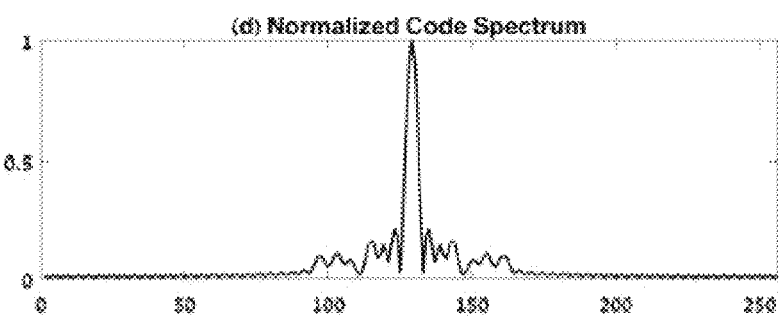
Figure 9E:
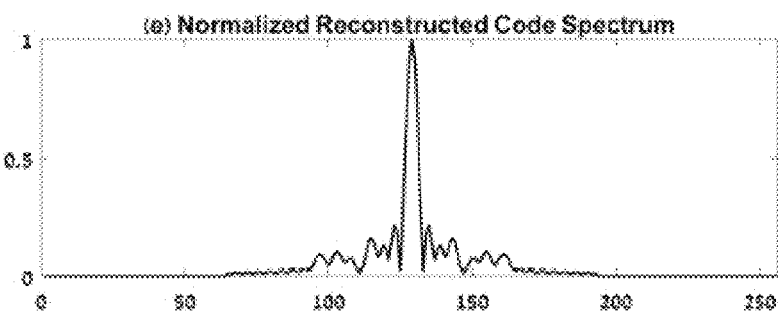

The system was simulated as an aperture that behaves in spectral domain as a band-pass filter allowing to pass only 23 pixels and zeroing all the other pixels outside the aperture. For the shake of clarity, the spectrum of the object (region of interest) is shown in FIG. 9A and the low-resolution object spectrum, after being low-passed by the aperture of the imaging lens, is shown in FIG. 9B. The super-resolved spectrum is shown in FIG. 9C. The reconstruction was obtained following the processing technique detailed above. The encoding function was a random space limited function with N=256 pixels, whose Fourier coefficients are shown in FIG. 9D. The reconstruction of the encoding spectrum (encoded structure) is depicted in FIG. 9E. All the shown coefficients were normalized against $a_0$.

Figure 10A:
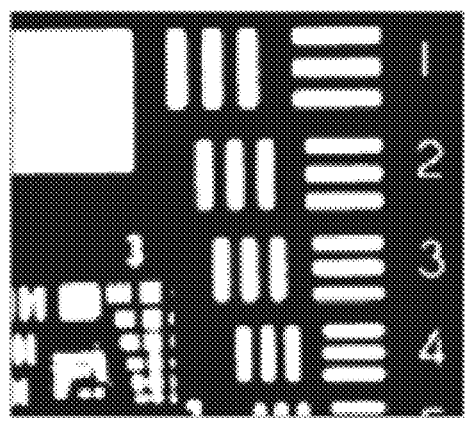
FIGS. 10A to 10C show numerical simulation of the proposed concept for 2D objects; wherein FIG. 10A show the original image.
Figure 10B:
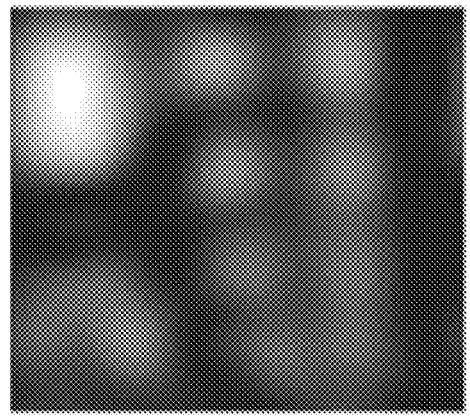
Figure 10C:
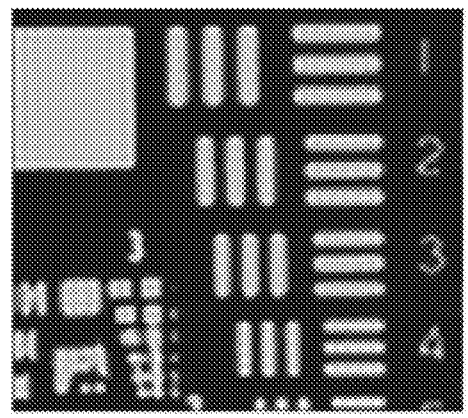

Reference is made to FIGS. 10A to 10C showing numerical simulation of the proposed concept for 2D objects/regions of interest. A test target (being a USAF resolution target model R3L3S1N from Thorlabs) was used, Whose original image is shown in FIG. 10A. The low-resolution image (diffraction limited image) of the target is seen in FIG. 10B, The super-resolved image reconstruction is shown in FIG. 10C. The technique for 2-dimensions includes conversion of the image matrix into a single row, performing the required adjustments of the encoding Fourier coefficient and then use the 1-dimensional processing described above.

The inventors have experimentally verified the technique of the present disclosure. The experimental setup used by the inventors includes a Genesis MX532-3 MTM OPSL laser as a coherent light source, with a wavelength of 532 nm, and a Texas Instrument's E4500MKII fiber coupled DMD projector commercially available from EKB Technologies Ltd. interconnected between them. A random 1D pattern was projected on the target and diffraction limited image of the so-encoded response of the target was detected by a Basler acA1920-25 um CCD camera, providing image data being the product between the encoding pattern and the target.

The imaging system was designed to coordinate the shifting of a pixel from the projector to a shifting of a pixel on the camera. Generally, an imaging system with a limited spatial frequency can be modelled as a 4-f system with two ideal lenses and a, spatial aperture located at the focal plane of the first lens (imaging configuration). In order to achieve a balance in the system between the minimum element size in the object, the size of the camera's pixels and the size of the projector's pixel, the inventors chose a group size in the USAF target that is big enough and that the used lens was able to resolve. Therefore, in order to be able to unresolve the object a small aperture was required which could not be realized. Therefore, the inventors chose to limit the object's spectrum with a digital low-pass filter, which simulates the action of a bad quality lens in the imaging system, i.e., the diffraction limit. All the images taken by the camera were Fourier transformed, and each multiplied by a low-pass filter.

Figure 11A:
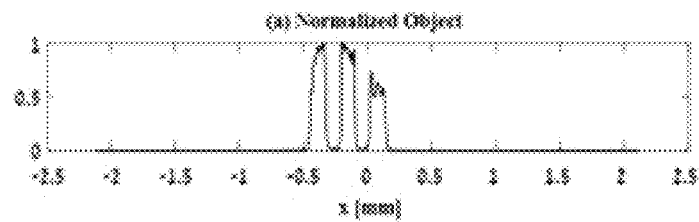
Figure 11B:
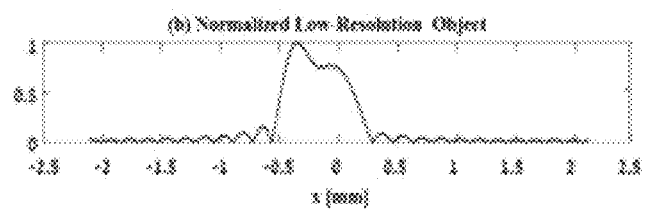
Figure 11C:
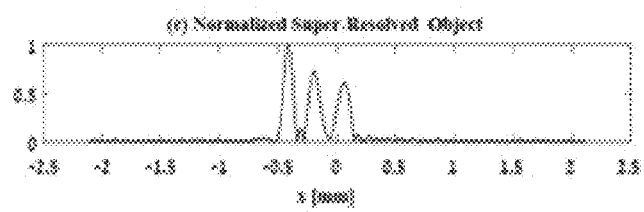
Figure 11D:
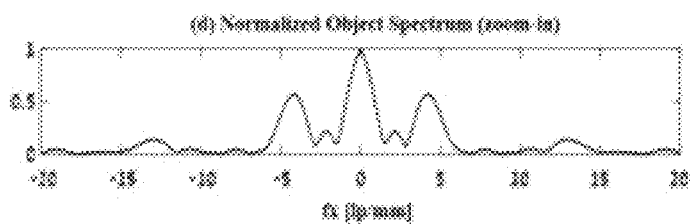
Figure 11E:
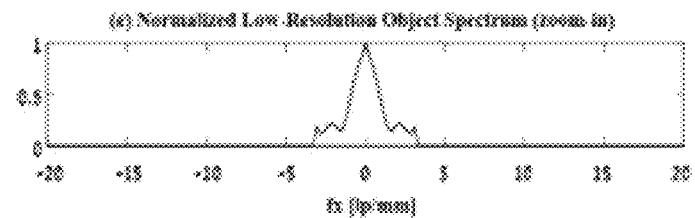
Figure 11F:
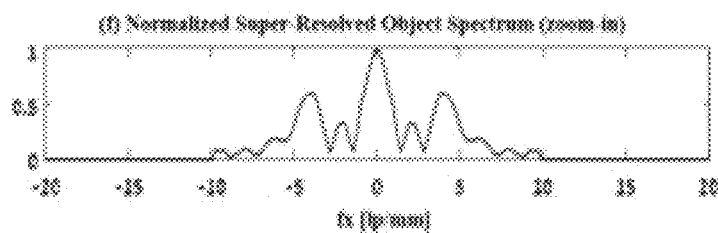

The images of the USAF target were taken in a specific part of the target containing three lines with resolution of 4 lp/mm. In this connection, reference is made to FIGS. 11A-11f illustrating the experimental results. The original object (region of interest) is shown in FIG. 11A. The maximum resolution that can pass through the digital low pass filter is $13/(1920 \cdot 2.2) \cdot 10^3 \approx 3.08$ lp/mm, therefore the imaging system cannot resolve the three lines the object is containing. The low-resolution object is shown in FIG. 11B, and its spectrum is shown in FIG. 11E.

By projecting a randomly encoded 1D pattern, spatially shifting the pattern, acquiring the so-obtained encoded diffraction limited images, and implementing the above-described image processing, the inventors were able to reconstruct the three lines of the object having a frequency of 4 lp/mm. One can see the three lines in the reconstructed super-resolved object in FIG. 11C. Additionally, one can see the significant weight of the 4 lp/mm frequency coefficient in the spectrum of the super-resolved object in FIG. 11F.

Figure 12A:
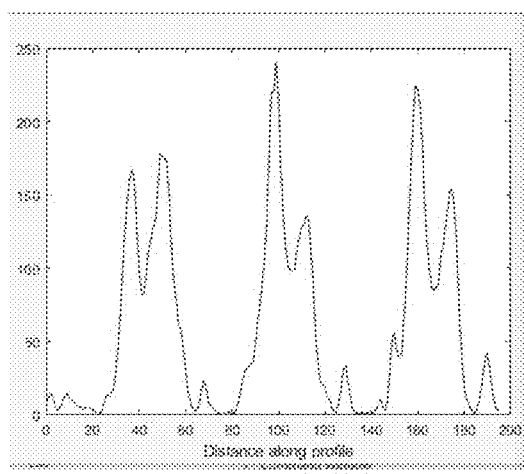
Figure 12B:
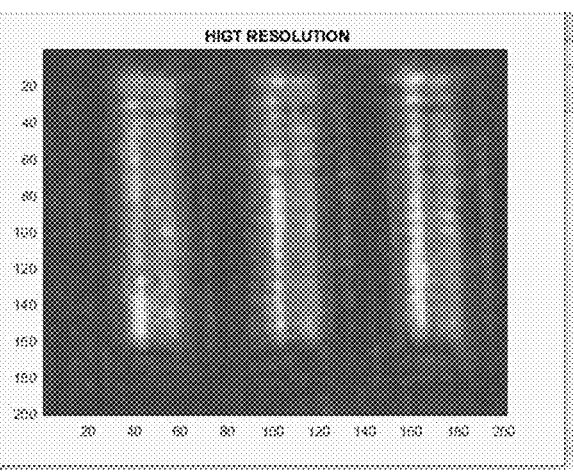
Figure 12C:
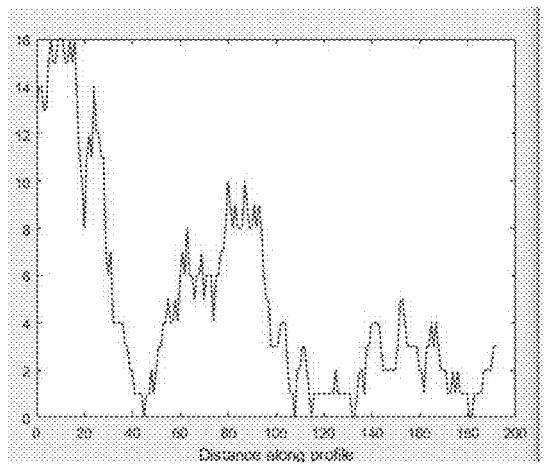
Figure 12D:
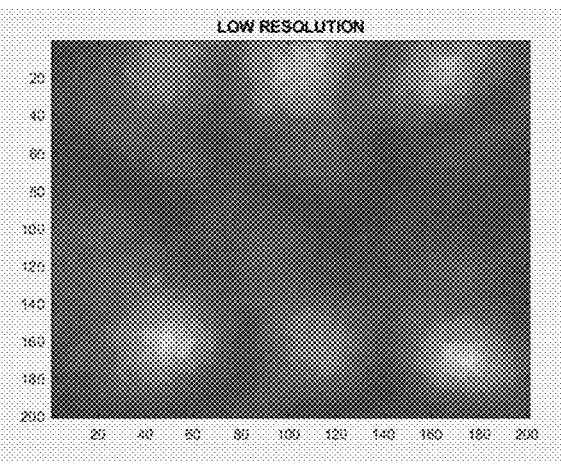

FIGS. 12A to 12D show an example of imaging three lines of a resolution target using the technique of the disclosure, compared with imaging using a diffraction-limited imaging arrangement. FIGS. 12A and 12B show, respectively, a cross section (FIG. 12A) and the full image (FIG. 12B) of a super-resolved image using the image reconstruction technique described above. FIGS. 12C and 12D show, respectively, the cross section (FIG. 12C) and the full image (FIG. 12D) of the low-resolution image obtained with a diffraction-limited imaging arrangement.

Thus, the technique of the present disclosure a novel super resolving approach based on time multiplexing to overcome the diffraction limitation. The novelty presented in this disclosure stems from the ability to improve the spatial resolution even without knowing the encoding pattern/structure projected on the object.

The technique of the present disclosure may be used in super-resolving through scattering mediums, e.g., biological tissue in which case the encoded structure is unavoidably unknown. The imaging through scattering medium will be done by illuminating the region of interest that is behind the scattering medium, through the medium. This will cause projection of primary speckle patterns on the inspected object. By slightly shifting the laser path, the un-known speckle pattern projected on the region of interest plane will laterally shift as well, but will be substantially maintained constant in the shifted instances due to the "memory effect" of the scattering medium. A set of low-resolution images will be captured. The projected speckle pattern is unknown but the technique of the present disclosure enables to extract the pattern.

The projected speckle pattern, resulting from the coherent light beam interaction with a scattering medium, can be of high spatial frequencies since the highest projected spatial frequency is proportional to the spot size of the coherent light beam projected on the scattering medium. The size of the spot can be adjusted such that it will create the encoded structure having sufficiently high spatial frequency as required by the intended super resolution.

Thus, the procedure of imaging of a region of interest through a scattering medium (generally, spatial light encoder) includes slightly shifting the input light beam and each time capturing the low resolution encoded images. Then, applying the above-described process of reconstructing/decoding the detected encoded light response of the region of interest to obtain super-resolved image reconstruction of the region of interest.

The invention claimed is:

1. An imaging system for imaging a region of interest comprising:
    an imaging arrangement having a characteristic diffraction limited resolution and being configured and operable to perform a sequence of M image acquisitions, the imaging arrangement comprising:

a projector system configured to project a coherent light beam propagating along a general propagation path onto a patterned structure of a spatial light encoder, interaction of the coherent light beam with the spatial light encoder during the image acquisition comprising applying an encoding function to the coherent light beam and producing a light field of spatially-encoded illumination structures propagating towards the region of interest, thereby providing encoded illumination of the region of interest during said image acquisition; and a detection system at a certain fixed location with respect to the region of interest, the detection system being configured for collecting light responses from the region of interest to the encoded illumination and creating diffraction limited images R of the region of interest on a detector array, the image acquisition thereby comprising creation of an encoded image, being a diffraction limited image encoded by the encoding function of the spatial encoder; and a position controller configured and operable to sequentially provide relative displacements along at least an x-axis between the region of interest and said general propagation path of the coherent light beam onto the spatial light encoder, such that said relative displacements provide a sequence of M laterally displaced encoded illuminations in a region of interest plane, corresponding to coherent light interactions with different segments of the spatial light encoder, resulting in creation of sequence of the diffraction limited encoded images on the detector array, wherein each of the lateral displacements is controlled to satisfy a predetermined condition with respect to a predetermined super-resolution d, such that sequence of said M laterally displaced encoded illuminations applied to the region of interest have substantially the same encoding function and have substantially constant appearances of an encoded structure of said light field therein, said predetermined condition for the lateral displacement comprising one of the following: the lateral displacement $\delta x$ is equal or smaller than predetermined super-resolution parameter d, or an effective value $\delta x'$ of the lateral displacement is determined as $\delta x'=\delta x \cdot M_f$, where $M_f$ is a magnification factor of the imaging arrangement; or the lateral displacement $\delta x$ is determined as $\delta x=Cd+Bd$, where C is integer $C \geq 1$, and $0<B<1$; thereby enabling super-resolution reconstruction of an image of the region of interest, through computational reconstruction of M image data pieces produced by the detector array in the M image acquisitions being indicative of M diffraction limited images $R_m$ (m=1, . . . M) corresponding to detected light responses of said plurality of M encoded illuminations of the region of interest.

2. The imaging system according to claim 1, wherein said predetermined condition is $\delta x<d$.

3. The imaging system according to claim 1, wherein said predetermined condition is $\delta x=Cd+Bd$, where C is integer $C \geq 1$, and $0<B<1$.

4. The imaging system according to claim 1, wherein the position controller is configured and operable to sequentially provide said relative displacements, including lateral displacements $\delta x'$ along at least the x-axis.

5. The imaging system according to claim 4, wherein the lateral displacement is determined as $\delta x'=\delta x \cdot M_f$, where $M_f$ is a magnification factor of the imaging arrangement.

6. The imaging system according to claim 1, wherein the position controller is configured and operable to sequentially provide said relative displacements, including angular displacements $\alpha$ of the general propagation path.

7. The imaging system according to claim 6, wherein said angular displacements $\alpha$ of the general propagation path are determined as $\tan(\alpha)=\delta x/z$, where z is a distance between spatial light encoder and region of interest planes.

8. The imaging system according to claim 1, wherein said detection system sequentially provides the plurality of the M diffraction limited images $R_m$, each diffraction limited image being a product of an image of the region of interest $S_m(x)$ with the encoded structure $E_m$, thereby enabling the reconstruction of the image of the region of interest from the plurality of M image data pieces with spatial resolution higher than said characteristic diffraction limited resolution of the imaging arrangement.

9. The imaging system according to claim 1, further comprising a control unit configured for data communication with the imaging arrangement and operable to receive and process said image data pieces $R_m$ to perform said super-resolution reconstruction of the image S(x) of the region of interest.

10. The imaging system according to claim 9, wherein said control unit comprises:

a first processor configured and operable to receive said image data pieces $R_m$, being determined as $S_m \cdot E_m$, and perform a Fourier transform to obtain $\tilde{R}$;

a second processor configured and operable to utilize input data indicative of the displacement $\delta x$ and a required super-resolution $\delta \mu$, and extract from said Fourier transform $\tilde{R}$ a spectral representation, $\tilde{S}(\mu)$, of the image of the region of interest; and a third processor configured to perform inverse Fourier transform of the spectral representation, $\tilde{S}(\mu)$, to extract the image of the region of interest S(x) along said at least x-axis.

11. The imaging system according to claim 1, wherein said spatial encoder comprises a spatial light modulator.

12. The imaging system according to claim 1, wherein said spatial encoder comprises a scattering medium, said encoded structure being in the form of a primary speckle pattern.

13. The imaging system according to claim 12, wherein the spatial resolution is of the order of a smallest speckle size d being determined as $\lambda z/D$, wherein $\lambda$ is a wavelength of the coherent light beam, z is a distance from the recording medium to the region of interest, and D is a spot size of projection of the coherent light beam onto the scattering medium.

14. The imaging system according to claim 1, wherein the spatial light encoder is transmitting for said coherent light beam such that the coherent light beam passes through the spatial light encoder and propagates towards the region of interest, thereby providing for super-resolution imaging of the region of interest located behind the spatial light encoder.

15. The imaging system according to claim 14, wherein the detection system is located upstream of the spatial light encoder with respect to the general propagation direction of said coherent light beam, such that the light responses from the region of interest to the encoded illumination pass through the spatial light encoder towards the detection arrangement.

16. The imaging system according to claim 14, wherein the spatial light encoder is a scattering medium, said encoded structure being in the form of a primary speckle pattern.

17. The imaging system according to claim 16, wherein the spatial resolution is of the order of a smallest speckle size d being determined as $\lambda z/D$, wherein $\lambda$ is a wavelength of the coherent light beam, z is a distance from the recording medium to the region of interest, and D is a spot size of projection of the coherent light beam onto the scattering medium.

18. The imaging system according to claim 17, wherein the detection system is located upstream of the spatial light encoder with respect to the general propagation direction of said coherent light beam, such that the light responses from the region of interest to the encoded illumination pass through the spatial light encoder towards the detection arrangement.

19. The imaging system according to claim 16, wherein said position controller is configured to provide said relative displacements by angular displacements $\alpha$ of the general propagation path of the coherent light beam with respect to the scattering medium, said angular displacements $\alpha$ being determined as $\tan(\alpha)=\delta x/z$, where z is a distance between spatial light encoder and region of interest planes.

20. The imaging system according to claim 1, wherein said position controller is configured to provide a relative displacement of the general propagation path of the coherent light beam with respect to the spatial light encoder.

21. The imaging system of claim 1, configured for imaging the region of interest located behind the spatial light encoder configured as a scattering medium transmitting with respect to said coherent light.

22. The imaging system of claim 1, configured for imaging the region of interest inside a subject's body via a scattering medium of a skin operating as said spatial light encoder transmitting the coherent light beam therethrough and transmitting the light responses of the region of interest therethrough towards the detection system, said encoded structure being in the form of a primary speckle pattern.

23. The imaging system according to claim 22, wherein the spatial resolution of the reconstructed image is of the order of a smallest speckle size d being determined as $\lambda z/D$, wherein $\lambda$ is a wavelength of the coherent light beam, z is a distance from the recording medium to the region of interest, and D is a spot size of projection of the coherent light beam onto the scattering medium.

24. The imaging system according to claim 22, wherein said position controller is configured to provide said relative displacements by angular displacements $\alpha$ of the general propagation path of the coherent light beam to the scattering medium, said angular displacements $\alpha$ being determined as $\tan(\alpha)=\delta x/z$, where z is a distance between spatial light encoder and region of interest planes.

25. An imaging system for imaging a region of interest, the imaging system comprising:
an imaging arrangement having a characteristic diffraction limited resolution and being configured and operable to perform a sequence of M image acquisitions, the imaging arrangement comprising:
a projector unit configured to project a coherent light beam propagating along a general propagation path onto a region of interest after an interaction of the coherent light beam with a scattering medium located in said general propagation path at a distance z from a region of interest plane, the interaction of the coherent light beam with the scattering medium during the image acquisition comprising applying an encoding function to the coherent light beam and producing a primary speckle pattern of unknown spatially-encoded illumination structures, said primary speckle pattern being projected on the region of interest plane having a smallest speckle size d on the region of interest plane determined as $\lambda z/D$, wherein $\lambda$ is a wavelength of the coherent light beam, and D is a spot size of projection of the coherent light beam onto the scattering medium, thereby forming encoded speckles illumination of the region of interest during said image acquisition; and
a detection arrangement at a certain fixed location with respect to the region of interest, the detection arrangement being configured for collecting encoded speckled light responses from the region of interest, having propagated back through the scattering medium and creating a diffraction limited images of the region of interest on a detector array, the image acquisition thereby comprising creation of an encoded image, being a diffraction limited image encoded by the encoding function of the scattering medium; and
a position controller configured and operable to sequentially provide relative displacements $\delta x$ along at least an x-axis between the region of interest and said general propagation path of the coherent light beam onto the scattering medium, wherein each of the lateral displacements is controlled to satisfy a predetermined condition with respect to said smallest size d, such that said relative displacements $\delta x$ provide a sequence of M laterally displaced encoded illuminations in a region of interest plane that have substantially the same encoding function, corresponding to coherent light interactions with different segments of the scattering medium, resulting in creation of a sequence of the diffraction limited encoded images on the detector array, such that said M laterally displaced encoded illuminations are characterized by substantially constant appearances of encoded structure of said light field therein, said predetermined condition for the lateral displacement comprising one of the following: the lateral displacement $\delta x$ is equal or smaller than predetermined super-resolution parameter d, or an effective value $\delta x'$ of the lateral displacement is determined as $\delta x'=\delta x \cdot M_f$, where $M_f$ is a magnification factor of the imaging arrangement; or the lateral displacement $\delta x$ is determined as $\delta x=Cd+Bd$, where C is integer $C \geq 1$, and $0<B<1$; thereby enabling super-resolution reconstruction of an image of the region of interest from M image data pieces produced by the detector array in the M image acquisitions being indicative of M diffraction limited images $R_m$ (m=1, . . . M) corresponding to detected light responses of said sequence of the M encoded illuminations of the region of interest with the unknown encoding patterns of said encoded structure of the light field, the super-resolution being of the order of the smallest speckle size d.

26. A method for imaging a region of interest comprising:
projecting a coherent light beam propagating along a general propagation path onto the region of interest via a tissue portion of the subject's body located at a distance z from the region of interest, said tissue portion operating as a scattering medium during image acquisition applying an encoding function to the coherent light beam interacting with said scattering medium and producing a primary speckle pattern of unknown spatially-encoded illumination structures forming encoded speckled illumination of the region of interest during said image acquisition, said primary speckle pattern being projected on the region having a smallest speckle size d determined as $\lambda z/D$, wherein $\lambda$ is a wavelength of the coherent light beam, and D is a spot size of projection of the coherent light beam onto the scattering medium; and collecting light responses of the region of interest to said encoded speckled illumination, and creating diffraction limited images of the region of interest on a detector array, the image acquisition thereby comprising creation of an encoded image, being a diffraction limited image encoded by the encoding function of the scattering medium;

while performing said projecting of the coherent light beam onto the region of interest, sequentially displacing the general propagation path of the coherent light beam by displacements $\delta x$ along at least an x-axis between the region of interest and said general propagation path of the coherent light beam onto the scattering medium, wherein each of the lateral displacements is controlled to satisfy a predetermined condition with respect to said smallest size d, thereby providing a sequence of M laterally displaced encoded illuminations on a region of interest plane having substantially the same encoding function, corresponding to coherent light interactions with different segments of the scattering medium, resulting in creation of a sequence of the diffraction limited encoded images on the detector array, being formed by different unknown spatially-encoded illumination structures and being characterized by substantially constant appearances of the primary speckle pattern $E_m$ (m=1, . . . M), causing sequential creation, on the detector array, of a corresponding plurality of M diffraction limited images $R_m$ having substantially same primary speckle pattern $E_m$, and generating a plurality of M image data pieces indicative of said plurality of the diffraction limited images $R_m$, said predetermined condition for the lateral displacement comprising one of the following: the lateral displacement $\delta x$ is equal or smaller than said smallest size d, or an effective value $\delta x'$ of the lateral displacement is determined as $\delta x' = \delta x \cdot M_f$, where $M_f$ is a magnification factor of the imaging arrangement; or the lateral displacement $\delta x$ is determined as $\delta x = Cd + Bd$, where C is integer $C \geq 1$, and $0 < B < 1$; thereby enabling super-resolution reconstruction of an image $S(x)$ of the region of interest from the plurality of said image data pieces.

27. An imaging system for imaging a region of interest comprising:
an imaging arrangement having a characteristic diffraction limited resolution, the imaging arrangement comprising:
a projector system configured to project a coherent light beam propagating along a general propagation path onto a patterned structure of a spatial light encoder, interaction of the coherent light beam with the spatial light encoder producing a light field of an encoded structure propagating towards the region of interest, thereby providing encoded illumination of the region of interest; and
a detection system at a certain fixed location with respect to the region of interest, the detection system being configured for collecting light response from the region of interest to said encoded illumination and creating a diffraction limited image R of the region of interest on a detector array; and
a position controller configured and operable to sequentially provide relative displacements between the general propagation path and the region of interest, including angular displacements $\alpha$ of the general propagation path determined as $\tan(\alpha) = \delta x/z$, where z is a distance between spatial light encoder and region of interest planes, such that said relative displacements provide a plurality of M laterally displaced encoded illuminations in a region of interest plane, by at least a lateral displacement $\delta x$ along at least an x-axis respectively, such that said M laterally displaced encoded illuminations are characterized by substantially constant appearances of the encoded structure of said light field, thereby enabling super-resolution reconstruction of an image of the region of interest from a plurality of M image data pieces produced by the detector array being indicative of M diffraction limited images $R_m$ (m=1, . . . M) corresponding to detected light responses of said plurality of M encoded illuminations, eliminating a need for prior knowledge of data indicative of the encoded structures of the light field.

28. A control unit configured and operable for super-resolution reconstruction of an image of a region of interest, the control unit being configured for data communication with the imaging system of claim 1, and to receive and process image data provided by the imaging system comprising M image data pieces $R_m$ indicative of an image $S(x)$ of the region of interest, the control unit comprising:
a first processor configured and operable to receive said image data pieces $R_m$, being determined as a product, $S_m \cdot E_m$, of image $S_m$ of the region of interest and spatial information $E_m$ of an encoded structure of the spatially-encoded illumination used in acquiring said image of the region of interest, the first processor being configured and operable to process said image data pieces $R_m$ by applying thereto a Fourier transform to obtain $\tilde{R}$;
a second processor configured and operable to utilize input data indicative of the displacements $\delta x$ along at the least x-axis between the region of interest and the illumination propagation path of the coherent light onto the spatial encoder used in the image acquisitions to provide said interactions of the coherent light with the different segments of the patterned structure of the spatial encoder and obtaining said image data pieces $R_m$ and input data indicative of a required super-resolution $\delta \mu$ defined by a smallest feature size d of the encoded illumination at the region of interest plane, and process said Fourier transform $\tilde{R}$ to extract from said Fourier transform $\tilde{R}$ a spectral representation, $\tilde{S}(\mu)$, of the image of the region of interest; and
a third processor configured to perform inverse Fourier transform of the spectral representation, $\tilde{S}(\mu)$, to extract the image of the region of interest $S(x)$ along said at least x-axis.

* * * * *